United States Patent
Ou et al.

(10) Patent No.: US 7,122,495 B2
(45) Date of Patent: *Oct. 17, 2006

(54) COMBINED CRACKING AND SELECTIVE HYDROGEN COMBUSTION FOR CATALYTIC CRACKING

(75) Inventors: John Di-Yi Ou, Houston, TX (US); Neeraj Sangar, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 516 days.

This patent is subject to a terminal disclaimer.

(21) Appl. No.: 10/671,281

(22) Filed: Sep. 24, 2003

(65) Prior Publication Data

US 2004/0152586 A1 Aug. 5, 2004

Related U.S. Application Data

(63) Continuation-in-part of application No. 10/369,880, filed on Feb. 20, 2003, and a continuation-in-part of application No. 10/358,977, filed on Feb. 5, 2003, and a continuation-in-part of application No. 10/358,569, filed on Feb. 5, 2003, and a continuation-in-part of application No. 10/358,564, filed on Feb. 5, 2003.

(51) Int. Cl.
C10G 11/02 (2006.01)
B01J 29/00 (2006.01)

(52) U.S. Cl. ............... 502/64; 502/34; 502/302; 502/324; 208/108; 208/109; 208/110; 208/111; 208/112; 208/113; 208/118; 208/120.01; 208/120.05; 208/120.1; 208/121; 585/659; 585/800

(58) Field of Classification Search ............... 208/108, 208/109, 110, 111, 112, 113, 118, 120.1, 208/120.05, 121; 502/34, 64, 302, 324; 585/659, 585/800

See application file for complete search history.

(56) References Cited

U.S. PATENT DOCUMENTS

| | | | | |
|---|---|---|---|---|
| 3,769,237 | A | 10/1973 | Ondrey et al. | 252/464 |
| 3,872,148 | A | 3/1975 | Umemura et al. | 260/465.3 |
| 4,072,600 | A | 2/1978 | Schwartz | 208/120 |
| 4,107,032 | A | 8/1978 | Chester | 208/120 |
| 4,137,151 | A | 1/1979 | Csicsery | 208/120 |
| 4,208,269 | A | 6/1980 | Gladrow et al. | 208/120 |
| 4,335,258 | A | 6/1982 | Onoda et al. | 562/599 |
| 4,368,114 | A | 1/1983 | Chester et al. | 208/120 |
| 4,368,346 | A | 1/1983 | Eastman | 585/658 |
| 4,419,270 | A | 12/1983 | Ueshima et al. | 502/209 |
| 4,450,241 | A * | 5/1984 | Hettinger et al. | 502/34 |
| 4,451,355 | A | 5/1984 | Mitchell et al. | 208/113 |
| 4,454,025 | A | 6/1984 | Hettinger, Jr. | 208/120 |
| 4,466,884 | A | 8/1984 | Occelli et al. | 208/120 |
| 4,497,971 | A | 2/1985 | Eastman et al. | 585/658 |
| 4,547,615 | A | 10/1985 | Yamamoto | 585/621 |
| 4,568,790 | A | 2/1986 | McCain | 585/658 |
| 4,596,787 | A | 6/1986 | Manyik et al. | 502/312 |
| 4,620,051 | A | 10/1986 | Kolts et al. | 585/663 |
| 4,629,718 | A | 12/1986 | Jones et al. | 502/241 |
| 4,689,436 | A | 8/1987 | Minokani et al. | 585/422 |
| 4,777,319 | A | 10/1988 | Kung et al. | 585/624 |
| 4,781,816 | A | 11/1988 | Lee et al. | 208/120 |
| 4,810,358 | A | 3/1989 | Groenenboom | 208/121 |
| 4,861,936 | A | 8/1989 | Sofranko et al. | 585/500 |
| 4,889,615 | A * | 12/1989 | Chin et al. | 208/113 |
| 4,912,081 | A | 3/1990 | Sofranko et al. | 502/207 |
| 4,940,826 | A | 7/1990 | Font Freide et al. | 585/600 |
| 4,957,718 | A | 9/1990 | Yoo et al. | 423/244 |
| 4,980,052 | A * | 12/1990 | Green et al. | 208/120.1 |
| 4,988,654 | A | 1/1991 | Kennedy et al. | 502/84 |
| 5,002,653 | A | 3/1991 | Kennedy et al. | 208/118 |
| 5,021,145 | A | 6/1991 | Chapple | 208/120 |
| 5,043,522 | A | 8/1991 | Leyshon et al. | 585/651 |
| 5,053,578 | A | 10/1991 | Michaels et al. | 585/500 |
| 5,057,205 | A * | 10/1991 | Chin et al. | 208/121 |
| 5,105,052 | A | 4/1992 | Font Freide et al. | 585/651 |
| 5,167,795 | A | 12/1992 | Gartside | 208/67 |

| | | | |
|---|---|---|---|
| 5,254,779 A | 10/1993 | Mazzocchia et al. | 585/500 |
| 5,194,413 A | 11/1993 | Kumar | 502/65 |
| 5,258,567 A | 11/1993 | Kerby et al. | 585/654 |
| 5,260,240 A | 11/1993 | Guthrie et al. | 502/41 |
| 5,306,858 A | 4/1994 | Salem et al. | 585/658 |
| 5,340,554 A | 8/1994 | Carnell | 423/235 |
| 5,365,006 A | 11/1994 | Serrand | 585/501 |
| 5,380,692 A | 1/1995 | Nakatsuji et al. | 502/303 |
| 5,386,074 A | 1/1995 | Durante et al. | 585/658 |
| 5,414,181 A | 5/1995 | Bearden et al. | 585/654 |
| 5,443,807 A | 8/1995 | Tang et al. | 423/247 |
| 5,378,349 A | 11/1995 | Senn | 208/121 |
| 5,476,981 A | 12/1995 | Umansky et al. | 585/656 |
| 5,486,284 A | 1/1996 | Degnan et al. | 208/120 |
| 5,527,979 A | 6/1996 | Agaskar et al. | 585/659 |
| 5,530,171 A | 6/1996 | Agaskar et al. | 585/658 |
| 5,550,309 A | 8/1996 | Maunders et al. | 585/654 |
| 5,625,111 A | 4/1997 | Astbury et al. | 585/653 |
| 5,639,929 A | 6/1997 | Bharadwaj et al. | 585/658 |
| 5,670,037 A | 9/1997 | Zaiting et al. | 208/114 |
| 5,846,402 A | 12/1998 | Mandal et al. | 208/113 |
| 5,861,530 A | 1/1999 | Atkins et al. | 560/247 |
| 5,866,737 A | 2/1999 | Hagemeyer et al. | 585/443 |
| 5,905,180 A | 5/1999 | Yokoyama et al. | 585/658 |
| 5,907,076 A * | 5/1999 | Ou et al. | 585/800 |
| 6,015,931 A | 1/2000 | Wu et al. | 585/649 |
| 6,130,183 A | 10/2000 | Herskowitz et al. | 502/349 |
| 6,133,386 A | 10/2000 | Morrell et al. | 526/130 |
| 6,153,089 A | 11/2000 | Das et al. | 208/134 |
| 6,169,202 B1 | 1/2001 | Wijesekera et al. | 562/549 |
| 6,300,534 B1 | 10/2001 | Konishi et al. | 585/441 |
| 6,355,854 B1 | 3/2002 | Liu | 585/658 |
| 6,459,006 B1 | 10/2002 | Ou et al. | 585/454 |
| 2001/0025129 A1 | 9/2001 | Liu | 585/661 |
| 2003/0091485 A1 | 5/2003 | Bierl et al. | 422/189 |
| 2003/0181325 A1 | 9/2003 | Ou et al. | 502/302 |

FOREIGN PATENT DOCUMENTS

| | | |
|---|---|---|
| EP | 0 201 152 A2 | 11/1986 |
| EP | 0 318 808 A2 | 6/1989 |
| EP | 0 425 666 A1 | 5/1991 |
| EP | 0 381 870 B1 | 5/1993 |
| EP | 0 921 175 A1 | 6/1999 |
| EP | 0 921 179 A1 | 6/1999 |
| EP | 1 077 082 A1 | 2/2001 |
| WO | WO 00/16901 A1 | 3/2000 |
| WO | WO 03/050065 A1 | 6/2003 |

OTHER PUBLICATIONS

Abstract, Mizuno et al., "*Selective oxidative dehydrogenation of propane at 380° C by $Cs_{2.5}Cu_{0.08}H_{3.34}PV_3Mo_9O_{40}$ catalyst*", Applied Catalysis A: General 146 (1996) pp. L249-L254, Elsevier Science.

\* cited by examiner

*Primary Examiner*—Glenn Caldarola
*Assistant Examiner*—Prem C. Singh
(74) *Attorney, Agent, or Firm*—Andrew B. Grithis

(57) ABSTRACT

A catalyst system and process for combined cracking and selective hydrogen combustion of hydrocarbons are disclosed. The catalyst system contains at least one solid acid component and at least one metal-based component which consists of (a) oxygen and/or sulfur and (b) a metal combination selected from the group consisting of:
  i) at least one metal from Group 3 and at least one metal from Groups 4–15 of the Periodic Table of the Elements;
  ii) at least one metal from Groups 5–15 of the Periodic Table of the Elements, and at least one metal from at least one of Groups 1, 2, and 4 of the Periodic Table of the Elements;
  iii) at least one metal from Groups 1 and 2, at least one metal from Group 3, and at least one metal from Groups 4–15 of the Periodic Table of the Elements; and
  iv) two or more metals from Groups 4–15 of the Periodic Table of the Elements, wherein the at least one of oxygen and sulfur is chemically bound both within and between the metals and, optionally, (3) at least one of at least one support, at least one filler and at least one binder. The process is such that the yield of hydrogen is less than the yield of hydrogen when contacting the hydrocarbons with the solid acid component alone. Further the emissions of $NO_x$ from the regeneration cycle of the catalyst system are reduced.

27 Claims, 1 Drawing Sheet

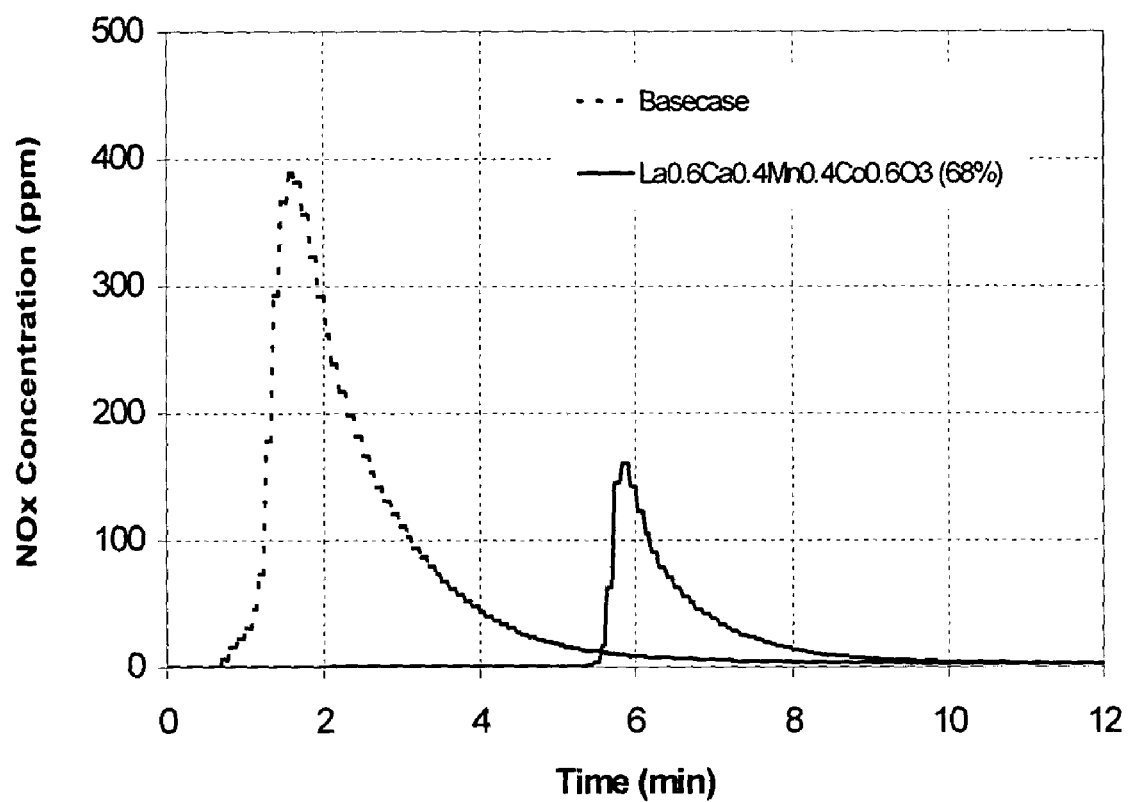

COMBINED CRACKING AND SELECTIVE HYDROGEN COMBUSTION FOR CATALYTIC CRACKING

CROSS-REFERENCE TO RELATED APPLICATIONS

This application is a Continuation-in-Part which claims priority to applications U.S. Ser. No. 10/369,880, filed Feb. 20, 2003; U.S. Ser. No. 10/358,569; filed Feb. 5, 2003, U.S. Ser. No. 10/358,564, filed Feb. 5, 2003; and U.S. Ser. No. 10/358,977, filed Feb. 5, 2003; each of which is hereby fully incorporated by reference.

BACKGROUND OF THE INVENTION

Field of the Invention

The present invention relates to a novel catalyst composition and its use in a novel hydrocarbon cracking process. The catalyst is particularly useful in reducing the concentration of hydrogen in cracking products and in reducing the emission of nitrogen oxides during catalyst regeneration.

DISCUSSION OF BACKGROUND INFORMATION

Current cracking technologies for the production of light olefins (e.g., ethylene, propylene, and butylenes), gasoline and other cracked products such as light paraffins and naphtha can be classified into the two categories of thermal cracking (also known as steam cracking) and catalytic cracking. While these technologies have been practiced for many years and are considered the workhorses for light olefin production, both have disadvantages.

Steam or thermal cracking, a robust technology that does not utilize catalyst, produces the more valuable ethylene as the primary light olefin product. It is particularly suitable for cracking paraffinic feedstreams to a wide range of products including hydrogen, light olefins, light paraffins, and heavier liquid hydrocarbon products such as pyrolysis gasoline and steam cracked gas oil. However, steam cracking is an expensive, complex technology due to required special construction material to sustain high cracking temperatures (~850° C.) and high energy input. Sulfur addition is required to passivate the furnace metal surfaces on a continuous basis, creating such undesirable side effects as environmental and product contamination. Steam cracking is not considered to be suitable for cracking feeds containing high concentrations of light olefins as it makes high levels of low value heavy by-products due to the more reactive nature of the olefin feeds. In addition, steam cracking makes a relatively low amount of propylene, and, therefore, is not considered suitable for meeting the anticipated growing demand for propylene in the future. Also, steam cracking requires steam dilution to control product selectivity and to maintain an acceptable run length; steam dilution is costly in terms of capital investment and energy consumption.

Current catalytic cracking technologies employ solid acid catalysts such as zeolites to promote cracking reactions. Unlike steam cracking technology, propylene is the primary light olefin product of catalytic cracking. Accordingly, catalytic cracking would be considered as the main source for growing propylene demand. Catalytic cracking can be classified into the following two general categories. The first category is Fluid Catalytic Cracking (FCC), which is the preferred refining process for converting higher boiling petroleum fractions into lower boiling products, such as gasoline, cracked naphtha and light olefins. The FCC catalyst of fine particles acts like a fluid and circulates in a closed cycle between a cracking reactor and a separate regenerator. In general, FCC catalysts can be classified into two categories—FCC base catalysts and FCC additive catalysts. Typical FCC catalysts contain the base catalysts which comprise a zeolite component and a matrix component. The zeolite is a major contributor for the catalyst activity, selectivity and stability. Examples of the zeolite component include Y zeolite and beta zeolite. The zeolite usually is treated with various modifications such as dealumination, rare earth exchange, or phosphorous treatment. Examples of typical matrix materials include amorphous compounds such as silica, alumina, silica-alumina, silica-magnesia, and clays such as kaolinite, halloysite, or montmorillonite. The matrix component can serve several purposes. It can be used to bind the zeolite component to form catalyst particles. It can serve as a diffusion medium for the transport of feed and product molecules. It also can act as a filler which dilutes the zeolite particles to moderate the catalyst activity. In addition, the matrix can help heat transfer.

Some FCC catalysts also contain FCC additive catalyst(s), including, by way of non-limiting examples, octane-boosting additives, metal passivation additives, SOx reduction additives, NOx reduction additives, CO oxidation additives, and coke oxidation additives. The additive catalyst(s) can be either incorporated into the base catalyst matrix or used as separate catalyst particles. When used as separate catalyst particles, the additive catalyst(s) will contain in addition to the catalytic active components their own matrix materials, which may or may not be the same as the base catalyst matrix. Examples (U.S. Pat. No. 4,368,114, which is incorporated herein by reference in its entirety) of the main catalytic components for octane-boosting additive catalysts include ZSM-5 zeolite, ZSM-11 zeolite, and beta zeolite. Examples of SOx reduction additives include magnesia, ceria-alumina, and rare earths on alumina. Examples of CO oxidation additives include platinum and/or palladium either directly added to the base catalyst at trace levels or dispersed on a support such as alumina or silica alumina (U.S. Pat. Nos. 4,072,600 and 4,107,032, which are incorporated herein by reference in their entirety). Non-limiting examples of coke oxidation promoters include lanthanum and iron embedded in the base catalyst (U.S. Pat. No. 4,137,151, which is incorporated herein by reference in its entirety). Examples of metal passivation additives include barium titanium oxide (U.S. Pat. No. 4,810,358, which is incorporated herein by reference in its entirety), calcium-containing additives selected from the group consisting of calcium-titanium, calcium-zirconium, calcium-titanium-zirconium oxides and mixtures thereof (U.S. Pat. No. 4,451,355, which is incorporated herein by reference in its entirety), and antimony and/or tin on magnesium-containing clays (U.S. Pat. No. 4,466,884, which is incorporated herein by reference in its entirety).

For a riser FCC unit, fresh feed contacts hot catalyst from the regenerator at the base of the riser reactor. The cracked products are discharged from the riser to pass through a main column, which produces several liquid streams and a vapor stream containing hydrogen, methane, ethane, propane, butane, and light olefins. The vapor stream is compressed in a wet gas compressor and charged to the unsaturated gas facility for product purification. Another technology in this category is moving bed cracking or Thermofor Catalytic Cracking (TCC). The TCC catalyst is in the form of small beads, which circulate between a reactor and a regenerator in the form of a moving bed. A further description of the FCC process may be found in the monograph, "Fluid Catalytic Cracking with Zeolite Catalysts," P. B. Venuto and E. T. Habib, Marcel Dekker, New York, 1978, incorporated by reference.

The second category of catalytic cracking is catalytic cracking of naphtha, the main purpose of which is the generation of light olefins. Either FCC-type reactor/regenerator technology (U.S. Pat. No. 5,043,522, which is incorporated herein by reference in its entirety), or fixed-bed reactor technology (EP0921175A1 and EP0921179A1, which are incorporated herein by reference in their entirety), can be used. The products, which include liquid streams and a vapor stream of hydrogen, methane, ethane, propane, butane, and light olefins go through a series of treatments similar to that for the FCC products.

As pointed out above, current cracking technologies typically produce vapor streams containing mixtures of hydrogen, light paraffins (e.g., methane, ethane, propane, and butanes) and light olefins. In some cases, such as ethane cracking, hydrogen is recovered in high purity as a valued product. In many other cases, such as steam cracking of naphtha, FCC of gas oil, and catalytic cracking of olefinic naphtha, hydrogen is undesirable due to the difficulty of separating $H_2$ from the light olefins (ethylene and propylene). The presence of even a moderate quantity of $H_2$ in cracked products necessitates such expensive equipment as multi-stage gas compressors and complex chill trains, which contribute significantly to the cost of olefin production. If cracked products could be produced with minimal or no hydrogen in the reactor effluent, a significant cost saving could be realized for grassroots plants and for debottlenecking existing plants, and lower olefin manufacturing cost could be realized.

Conventional approaches to deal with the hydrogen issue have focused on post-reactor separation. That is, attempts have been made to use various reaction and/or separation techniques such as pressure swing adsorption or membranes to remove hydrogen from the olefins. However, these technologies suffer from a few disadvantages. First, they mostly operate at relatively high pressure (greater than about 700 kPa), which does not help reduce the burden on the compressors. Second, these technologies are expensive. Third, their performance of separating the olefin product into a $H_2$-rich stream and a $H_2$-poor stream is often unsatisfactory. A typical problem has been the loss of olefins to the hydrogen-rich stream due to an incomplete separation. As a result, many commercial plants still employ the complex and costly high-pressure cryogenic separation.

U.S. Pat. No. 4,497,971, which is incorporated herein by reference in its entirety, relates to an improved catalytic process for the cracking and oxidative dehydrogenation of light paraffins, and a catalyst therefor. According to this patent, a paraffin or mixture of paraffins having from 2 to 5 carbon atoms is oxidatively dehydrogenated in the presence of a cobalt-based catalyst composition which not only has oxidative dehydrogenation capabilities but also has the capability to crack paraffins having more than two carbon atoms so that a paraffin such as propane can be converted to ethylene. If the feed to the oxidative dehydrogenation process contains paraffins having more than two carbon atoms, some cracking of such paraffins will occur at the conditions at which the oxidative dehydrogenation process is carried out.

U.S. Pat. No. 4,781,816, which is incorporated herein by reference in its entirety, relates to a catalytic cracking process and to a process for cracking heavy oils. It is an object of the disclosed invention to provide a process for cracking hydrocarbon-containing feedstocks, which contain vanadium compounds as impurities. According to this patent, the feedstream to be treated contains at least about 5 wppm vanadium. The catalyst comprises a physical mixture of zeolite embedded in an inorganic refractory matrix material, and at least one oxide of a metal selected from the group consisting of Be, Mg, Ca, Sr, Ba, and La (preferably MgO) on a support material comprising silica.

U.S. Pat. No. 5,002,653, which is incorporated herein by reference in its entirety, relates to an improved catalytic cracking process using a catalyst composition for use in the conversion of hydrocarbons to lower-boiling fractions. More particularly, the invention comprises a process for using a dual component catalyst system for fluid catalytic cracking, which catalyst demonstrates vanadium passivation and improved sulfur tolerance. The catalyst comprises a first component comprising a cracking catalyst having high activity, and, a second component, as a separate and distinct entity, the second component comprising a calcium/magnesium-containing material in combination with a magnesium-containing material, wherein the calcium/magnesium-containing compound is active for metals trapping, especially vanadium trapping.

U.S. Pat. No. 5,527,979, which is incorporated herein by reference in its entirety, relates to a catalytic oxidative dehydrogenation process for alkane molecules having 2 to 5 carbon atoms. It is an object of the disclosed invention to provide a process for dehydrogenation of alkanes to alkenes. More particularly, the invention comprises a process of at least two reactors in series, in which an alkane feed is dehydrogenated to produce alkenes and hydrogen over an equilibrium dehydrogenation catalyst in a first reactor, and the effluent from the first reactor, along with oxygen, is passed into a second reactor containing a metal oxide catalyst which serves to selectively catalyze the combustion of hydrogen. At least a portion of the effluent from the second reactor is contacted with a solid material comprising a dehydrogenation catalyst to further convert unreacted alkanes to additional quantities of alkenes and hydrogen. The equilibrium dehydrogenation catalyst comprises at least one metal from Cr, Mo, Ga, Zn and a metal from Groups 8–10. The metal oxide catalyst comprises an oxide of at least one metal from the group of Bi, In, Sb, Zn, Tl, Pb, and Te.

U.S. Pat. No. 5,530,171, which is incorporated herein by reference in its entirety, relates to a catalytic oxidative dehydrogenation process for alkane molecules having 2 to 5 carbon atoms. It is an object of the disclosed invention to provide a process for dehydrogenation of alkanes to alkenes. More particularly, the invention comprises a process of simultaneous equilibrium dehydrogenation of alkanes to alkenes and combustion of the hydrogen formed to drive the equilibrium dehydrogenation reaction further to the product alkenes. The process involves passing the alkane feed into a reactor containing both an equilibrium dehydrogenation catalyst and a reducible metal oxide, whereby the alkane is dehydrogenated and the hydrogen produced is simultaneously and selectively combusted in oxidation/reduction reaction with the reducible metal oxide. The process further comprises interrupting the flow of alkane into the reaction zone, reacting the reduced metal oxide with a source of oxygen to regenerate the original oxidized form of the reducible metal oxide, and resuming the reaction in the reaction zone using the regenerated from of the reducible metal oxide. The dehydrogenation catalyst comprises Pt or Pd, and the reducible metal oxide is an oxide of at least one metal from the group of Bi, In, Sb, Zn, Tl, Pb, and Te.

U.S. Pat. No. 5,550,309, which is incorporated herein by reference in its entirety, relates to a catalytic dehydrogenation process for a hydrocarbon or oxygenated hydrocarbon feed. More particularly, the invention comprises a process of contacting the feed with a catalyst bed comprising a dehydrogenation catalyst and a porous coated hydrogen retention agent in which the dehydrogenation catalyst produces a product stream of a dehydrogenated product and hydrogen and the porous coated hydrogen retention agent selectively removes, adsorbs, or reacts with some of the hydrogen from the product stream, removing the reaction products from the reaction chamber, removing the adsorbed hydrogen from the hydrogen retention agent, or oxidizing the reduced hydrogen retention agent to regenerate the hydrogen retention agent, and using the regenerated hydrogen retention agent for reaction with feed.

U.S. Pat. No. 4,466,884, which is incorporated herein by reference in its entirety, relates to a catalytic cracking process for feedstocks having high metals content such as vanadium, nickel, iron and copper. More particularly, the invention comprises a process of contacting the feed with a catalyst composition comprising a solid cracking catalyst and a diluent containing antimony and/or tin. The solid cracking catalyst is to provide good cracking activity. The diluent can be compound or compounds having little activity such as magnesium compounds or titanium compounds. The function of the antimony and/or tin in the diluent is to react with the nickel or vanadium in the feedstocks to form inert compounds thereby reducing the deactivating effects of nickel and vanadium on the solid cracking catalyst.

U.S. Pat. No. 4,451,355, which is incorporated herein by reference in its entirety, relates to a hydrocarbon conversion process for feedstocks having a significant concentration of vanadium. More particularly, the invention comprises a process of contacting the feed having a significant concentration of vanadium with a cracking catalyst containing a calcium containing additive selected from the group consisting of calcium-titanium, calcium-zirconium, calcium-titanium-zirconium oxides, and mixtures thereof. A preferred calcium additive is a calcium titanate perovskite (CaTiO3) or calcium zirconate (CaZrO3) perovskite. It is theorized that addition of the calcium-containing additive prevents the detrimental vanadium interaction with the zeolite in the cracking catalyst by acting as a sink for vanadium.

Emission of $NO_x$ from fluid catalytic cracking (FCC) regenerator is increasingly controlled by various state and local regulations. Current FCC regenerator flue gas contains significant $NO_x$ emissions (typically, in the range of 100–500 ppm), along with other pollutants, e.g., CO and $SO_x$. $NO_x$ emissions in the regenerator flue gas arise primarily from the oxidation of nitrogen-containing compounds deposited on the base cracking catalyst as coke. Nearly 40% of the nitrogen in the hydrocarbon feed is present as coke on the base catalyst before it enters the regenerator. Of this, roughly 10% of the nitrogen is oxidized to NO and released in the regenerator flue gas, while the remaining is reduced to $N_2$. Therefore, substantial $NO_x$ emissions can result from processing of high-nitrogen, gas oil feeds.

Conventional approaches to deal with $NO_x$ emissions in FCC regenerator flue gas have focused on post-reactor, selective catalytic reduction (SCR) of NO by $NH_3$. However, there are significant capital and operating costs associated with implementing SCR technology. More recently, de-$NO_x$ additives have been designed in a way that they do not affect the catalytic cracking reactions or product yields in the riser, while reducing $NO_x$ by CO present in the regenerator. The efficacy of these de-$NO_x$ additives depends greatly on CO concentration present during regeneration. Full-burn regenerators utilizing CO promoters to help oxidize CO to $CO_2$ have significantly lower CO concentration, thereby affecting the de-$NO_x$ performance of these additives.

A significant need exists for a cracking technology that overcomes the previously discussed disadvantages of present, commercial cracking technology due to of the presence of hydrogen in cracked products. Additionally, there is a need for a technology which can reduce the $NO_x$ emissions resulting from the regeneration of catalysts used in cracking.

SUMMARY OF THE INVENTION

The present invention relates to a catalyst system for reducing the hydrogen content of the effluent from a cracking reactor. The catalyst system comprises (1) at least one solid acid component and (2) at least one metal-based component, said metal-based component consisting essentially of (a) a metal combination selected from the group consisting of:

i) at least one metal from Group 3 and at least one metal from Groups 4–15 of the Periodic Table of the Elements;

ii) at least one metal from Groups 5–15 of the Periodic Table of the Elements, and at least one metal from at least one of Groups 1, 2, and 4 of the Periodic Table of the Elements;

iii) at least one metal from Groups 1–2, at least one metal from Group 3, and at least one metal from Groups 4–15 of the Periodic Table of the Elements; and iv) two or more metals from Groups 4–15 of the Periodic Table of the Elements and (b) at least one of oxygen and sulfur, wherein the at least one of oxygen and sulfur is chemically bound both within and between the metals.

In a further aspect the catalyst system can comprise at least one of at least one support, at least one filler, and at least one binder. Preferably, the solid acid component and the metal-based component are physically admixed.

The solid acid component can comprise at least one of at least one support, at least one filler and at least one binder. In another aspect, the solid acid component can comprise at least one of one or more amorphous solid acids, one or more crystalline solid acids, and one or more supported acids. In one embodiment of the present invention, the solid acid catalyst comprises at least one molecular sieve. In a preferred embodiment, the molecular sieve comprises at least one of crystalline silicates, crystalline substituted silicates, crystalline aluminosilicates, crystalline substituted aluminosilicates, crystalline aluminophosphates, crystalline substituted aluminophosphates, and/or zeolite-bound-zeolite, having 8- or greater-than-8 membered oxygen rings in framework structures. In another embodiment of the present invention, the solid acid component is at least one zeolite. The zeolite can comprise at least one of faujasite and MFI. The faujasite zeolite can be Y zeolite or modified Y zeolites such as, for example, dealuminated Y zeolite, high silica Y zeolite, or rare earth-exchanged Y zeolite. The MFI zeolite can be ZSM-5 zeolite or modified ZSM-5 zeolites such as phosphorous treated ZSM-5 zeolite and lanthanum treated ZSM-5 zeolite. In another embodiment of the present invention, the solid acid component can also be conventional FCC catalysts including catalysts containing zeolite Y, modified zeolite Y, Zeolite beta, and mixtures thereof, and catalysts containing a mixture of zeolite Y and a medium-pore, shape-selective molecular sieve species such as ZSM-5, or a mixture of an amorphous acidic material and ZSM-5. Such catalysts are described in U.S. Pat. No. 5,318,692, incorporated by reference herein.

In a further embodiment of the present invention, the metal-based component comprises at least one perovskite, spinel, or birnessite crystal structure. Furthermore, the metal-based component can comprise at least one of at least one support, at least one filler and at least one binder.

In one embodiment of the present invention, the metal-based component is a combination of oxygen and/or sulfur with one or more metals from Group 3 and one or more metals from Groups 4–15 of the Periodic Table of the Elements (hereinafter "sub-group 1"). Within sub-group 1, the preferred metals from Group 3 are at least one of scandium, yttrium, lanthanum, cerium, samarium, ytterbium and praseodymium; and the preferred metals from Groups 4–15 are titanium, zirconium, niobium, molybdenum, tungsten, manganese, iron, cobalt, iridium, nickel, palladium, platinum, copper, zinc, aluminum gallium, indium, germanium, tin, antimony, and bismuth.

In an alternative embodiment of the present invention, the metal-based component is a combination of oxygen and/or sulfur with one or more metals from Groups 5–15 of the Periodic Table of the Elements and one or more metals from at least one of Groups 1, 2, and/or Group 4 of the Periodic Table of the Elements (hereinafter "sub-group 2"). Within sub-group 2, the preferred metals from Groups 5–15 are at least one of niobium, molybdenum, tungsten, manganese, iron, cobalt, iridium, nickel, palladium, platinum, copper, zinc, aluminum gallium, indium, germanium, tin, antimony, and bismuth; the preferred metals from Groups 1 and 2 are sodium, potassium magnesium, calcium, strontium, and barium; and the preferred metals from Group 4 are titanium and zirconium.

In another alternative embodiment of the present invention, the metal-based component is a combination of oxygen and/or sulfur with one or more metals from Groups 1 and 2, one or more metals from Group 3, and one or more metals from Groups 4–15 of the Periodic Table of the Elements (hereinafter "sub-group 3"). Within sub-group 3, the preferred metals from Groups 1 and 2 are at least one of sodium, potassium, magnesium, calcium, strontium and barium; the preferred metals from Group 3 are at least one of scandium, yttrium, lanthanum, cerium, samarium, ytterbium and praseodymium; and the preferred metals from Groups 4–15 are at least one of titanium, zirconium, niobium, molybdenum, tungsten, manganese, iron, cobalt, iridium, nickel, palladium, platinum, copper, zinc, aluminum gallium, indium, germanium, tin, antimony, and bismuth.

In yet another embodiment of the present invention, the metal-based component is a combination of oxygen and/or sulfur with two or more metals from Groups 4–15 of the Periodic Table of the Elements (hereinafter "sub-group 4"). Within sub-group 4, the preferred metals from Groups 4–15 are at least two of titanium, zirconium, niobium, molybdenum, tungsten, manganese, iron, cobalt, iridium, nickel, palladium, platinum, copper, zinc, aluminum gallium, indium, germanium, tin, antimony, and bismuth.

According to another aspect of the present invention, a process comprises simultaneously contacting a hydrocarbon feedstream under cracking conditions with both a cracking catalyst and a selective hydrogen combustion catalyst in a catalyst system comprising (1) at least one cracking catalyst comprising at least one solid acid component and (2) at least one metal-based component which consists of (a) at least one of oxygen and sulfur and (b) a metal combination selected from the group consisting of:

i) at least one metal from Group 3 and at least one metal from Groups 4–15 of the Periodic Table of the Elements;

ii) at least one metal from Groups 5–15 of the Periodic Table of the Elements, and at least one metal from at least one of Groups 1, 2, and 4 of the Periodic Table of the Elements;

iii) at least one metal from Groups 1 and 2, at least one metal from Group 3, and at least one metal from Groups 4–15 of the Periodic Table of the Elements; and iv) two or more metals from Groups 4–15 of the Periodic Table of the Elements, wherein the at least one of oxygen and sulfur is chemically bound both within and between the metals.

Preferably, the yield of hydrogen is less than the yield of hydrogen when contacting said hydrocarbon feedstream(s) with said solid acid component alone under said catalytic reaction conditions.

In a further aspect of the present invention, a catalytic cracking process comprises:

(A) charging at least one hydrocarbon feedstream to a fluid catalytic cracking reactor, (B) charging a hot fluidized cracking/selective hydrogen combustion catalyst system from a catalyst regenerator to said fluid catalytic cracking reactor, said catalyst system comprising: (1) at least one cracking catalyst comprising at least one solid acid component and (2) at least one metal-based component consisting essentially of (a) a metal combination selected from the group consisting of:

i) at least one metal from Group 3 and at least one metal from Groups 4–15 of the Periodic Table of the Elements;

ii) at least one metal from Groups 5–15 of the Periodic Table of the Elements, and at least one metal from at least one of Groups 1, 2, and 4 of the Periodic Table of the Elements;

iii) at least one metal from Groups 1–2, at least one metal from Group 3, and at least one metal from Groups 4–15 of the Periodic Table of the Elements; and iv) two or more metals from Groups 4–15 of the Periodic Table of the Elements and (b) at least one of oxygen and sulfur, wherein the at least one of oxygen and sulfur is chemically bound both within and between the metals, (C) catalytically cracking said feedstream(s) and combusting resultant hydrogen at about 300 to about 800° C. to produce a stream of cracked products and uncracked feed and a spent catalyst system comprising said fluid catalytic cracking catalyst and said selective hydrogen combustion catalyst which are discharged from said reactor, (D) separating a phase rich in said cracked products and uncracked feed from a phase rich in said spent catalyst system, stripping said spent catalyst system at stripping conditions to produce a stripped catalyst phase, (E) decoking and oxidizing said stripped catalyst phase in a catalyst regenerator at catalyst regeneration conditions to produce said hot fluidized cracking/selective hydrogen combustion catalyst system, which is recycled to the said reactor, and (F) separating and recovering said cracked products and uncracked feed.

Another aspect of the present invention relates to a process comprising contacting at least one hydrocarbon feedstream with a cracking/selective hydrogen combustion catalyst system under effective catalytic reaction conditions to produce cracked products and uncracked feed comprising liquid and gaseous hydrocarbons, wherein the yield of hydrogen is less than the yield of hydrogen when contacting said hydrocarbon feedstream(s) with said cracking catalyst alone under said catalytic reaction conditions.

BRIEF DESCRIPTION OF THE DRAWINGS

FIG. 1 is a plot showing the $NO_x$ reduction properties of the catalyst system described herein.

DETAILED DESCRIPTION OF THE PRESENT INVENTION

Unless otherwise stated, all percentages, parts, ratios, and the like are by weight.

Unless otherwise stated, certain terms used herein shall have the following meaning.

The term "paraffins" shall mean compounds having no carbon-carbon double bonds and either the formula $C_nH_{2n+2}$ or $C_nH_{2n}$, where n is an integer.

The term "naphthenes" shall mean compounds having no carbon-carbon double bonds and the formula $C_nH_{2n}$, where n is an integer.

The term "paraffinic feedstream" shall mean a hydrocarbon feedstream containing some amount of paraffins but no olefins.

The term "olefins" shall mean non-aromatic hydrocarbons having one or more carbon-carbon double bonds.

The term "light olefins" shall mean ethylene, propylene, and butylenes.

The term "light paraffins" shall mean methane, ethane, propane, and butanes.

The term "catalyst to oil ratio" shall mean the relative amount of catalyst to hydrocarbon by weight.

The term "aromatics" shall mean compounds having one or more than one benzene ring.

The term "physical admixture" shall mean a combination of two or more components obtained by mechanical (i.e., non-chemical) means.

The term "chemically bound" shall mean bound via atom to atom bonds.

The term "cracking/selective hydrogen combustion" shall mean both cracking reaction and selective hydrogen combustion reaction.

The term "cracking catalyst" shall broadly mean a catalyst or catalysts capable of promoting cracking reactions whether used as base catalyst(s) and/or additive catalyst(s).

The term "selective hydrogen combustion catalyst" shall broadly mean a material or materials capable of promoting or participating in a selective hydrogen combustion reaction, using either free oxygen or lattice oxygen contained in the selective hydrogen combustion catalyst.

The term "cracking/selective hydrogen combustion catalyst" shall mean 1) a catalyst system comprised of a physical admixture of one or more cracking catalysts and one or more selective hydrogen combustion catalysts or 2) one or more selective hydrogen combustion catalysts chemically bound to one or more cracking catalysts.

The term "cracking" shall mean the reactions comprising breaking of carbon-carbon bonds and carbon-hydrogen bonds of at least some feed molecules and the formation of product molecules that have no carbon atom and/or fewer carbon atoms than that of the feed molecules.

The term "Group 3 metals" shall mean elements having atomic numbers of 21, 39, 57 through 71, and 89 through 92.

The term "selective hydrogen combustion" shall mean reacting hydrogen with oxygen to form water or steam without substantially reacting hydrocarbons with oxygen to form carbon monoxide, carbon dioxide, and/or oxygenated hydrocarbons.

The term "yield" shall mean weight of a product produced per unit weight of feed, expressed in terms of weight %.

Unless otherwise stated, a reference to an element, metal, compound, or component includes the element, metal, compound, or component by itself, as well as in combination with other elements, metal, compounds, or components, such as mixtures of compounds.

Further, when an amount, concentration, or other value or parameter is given as a list of upper preferable values and lower preferable values, this is to be understood as specifically disclosing all ranges formed from any pair of an upper preferred value and a lower preferred value, regardless of whether ranges are separately disclosed.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description making apparent to those skilled in the art how the several forms of the present invention may be embodied in practice.

Hydrocarbon Feedstream

The present invention relates to a catalyst system for treating a hydrocarbon feedstream. Such a feedstream could comprise, by way of non-limiting example, hydrocarbonaceous oils boiling in the range of about 221° C. to about 566° C., such as gas oil, steam cracked gas oil, and residues; heavy hydrocarbonaceous oils comprising materials boiling above about 566° C.; heavy and reduced petroleum crude oil; petroleum atmospheric distillation bottoms; petroleum vacuum distillation bottoms; heating oil; pitch; asphalt; bitumen; other heavy hydrocarbon residues; tar sand oils; shale oil; liquid products derived from coal liquefaction processes; and mixtures thereof. Other possible feedstreams could comprise steam heating oil, jet fuel, diesel, kerosene, gasoline, coker naphtha, steam cracked naphtha, catalytically cracked naphtha, hydrocrackate, reformate, raffinate reformate, Fischer-Tropsch liquids, Fischer-Tropsch gases, natural gasoline, distillate, virgin naphtha, $C_{5+}$ olefins (i.e., $C_5$ olefins and above), $C_{5+}$ paraffins, ethane, propane, butanes, butenes, and butadiene. The present invention is also useful for catalytically cracking olefinic and paraffinic feedstreams. Non-limiting examples of olefinic feedstreams are cat-cracked naptha, coker naptha, steam cracked gas oil, and olefinic Fischer-Tropsch liquids. Non-limiting examples of paraffinic feedstreams are virgin naptha, natural gasoline, reformate, and raffinate. Preferably, the hydrocarbon feedstream comprises at least one of paraffins, olefins, aromatics, naphthenes, and mixtures thereof, which produces light olefins, hydrogen, light paraffins, gasoline, and optionally, cracked naphtha, cracked gas oil, tar, and/or coke. Typically, the cracked products from processes in accordance with the present invention comprise hydrogen, light olefins, light paraffins, and olefins and paraffins having more than four carbon atoms. Products can be liquid and/or gaseous.

Catalyst System

The catalyst system of the present invention comprises (1) at least one solid acid component and (2) at least one metal-based component, said metal-based component consisting essentially of (a) a metal combination selected from the group consisting of:
i) at least one metal from Group 3 and at least one metal from Groups 4–15 of the Periodic Table of the Elements;
ii) at least one metal from Groups 5–15 of the Periodic Table of the Elements, and at least one metal from at least one of Groups 1, 2, and 4 of the Periodic Table of the Elements;
iii) at least one metal from Groups 1–2, at least one metal from Group 3, and at least one metal from Groups 4–15 of the Periodic Table of the Elements; and
iv) two or more metals from Groups 4–15 of the Periodic Table of the Elements and (b) at least one of oxygen and sulfur, wherein the at least one of oxygen and sulfur is chemically bound both within and between the metals.

Preferably the solid acid component is a cracking catalyst and the metal-based component is a selective hydrogen combustion catalyst.

The solid acid catalyst can be in physical admixture with, or chemically bound to, the metal-based component. The metals selected from combinations (i), (ii), (iii), or (iv) can be chemically bound, both between and within the Groups specified. For example, within combination (ii), it would be within the scope of the present invention for two or more metals from Groups 1 and 2 to be chemically bound to each other as well as chemically bound to the metal(s) from Groups 5–15. Alternatively, the chemical binding can be only between metals of different groups and not between metals within the same group, i.e., two or more metals from Groups 1 and 2 being in admixture with each other but chemically bound to the metal(s) from Groups 5–15.

Solid Acid

The solid acid component is described by the Brønsted and Lewis definitions of any material capable of donating a proton or accepting an electron pair. This description can be found in K. Tanabe. *Solid Acids and Bases: their catalytic properties*. Tokyo: Kodansha Scientific, 1970, p. 1–2. This reference is incorporated herein by reference in its entirety. The solid acid component can comprise at least one of a solid acid, a supported acid, or a mixture thereof. The solid acid component can comprise nonporous, microporous, mesoporous, macroporous solids or a mixture thereof. These porosity designations are IUPAC conventions and are defined in K. S. W. Sing, D. H. Everett, R. A. W. Haul L. Moscou, R. A. Pierotti, J. Rouquérol, T. Siemieniewska, *Pure&Appl. Chem.* 1995, 57(4), pp. 603–619, which is incorporated herein by reference in its entirety.

Non-limiting examples of solid acid components are natural clays such as kaolinite, bentonite, attapulgite, montmorillonite, clarit, fuller's earth, cation exchange resins and $SiO_2.Al_2O_3$, $B_2O_3.Al_2O_3$, $Cr_2O_3.Al_2O_3$, $MoO_3.Al_2O_3$, $ZrO_2.SiO_2$, $Ga_2O_3.SiO_2$, $BeO.SiO_2$, $MgO.SiO_2$, $CaO.SiO_2$, $SrO.SiO_2$, $Y_2O_3.SiO_2$, $La_2O_3.SiO_2$, $SnO.SiO_2$, $PbO.SiO_2$, $MoO_3.Fe_2(MoO_4)_3$, $MgO.B_2O_3$, $TiO_2.ZnO$, $ZnO$, $Al_2O_3$, $TiO_2$, $CeO_2$, $As_2O_3$, $V_2O_5$, $SiO_2$, $Cr_2O_3$, $MoO_3$, $ZnS$, $CaS$, $CaSO_4$, $MnSO_4$, $NiSO_4$, $CuSO_4$, $CoSO_4$, $CdSO_4$, $SrSO_4$, $ZnSO_4$, $MgSO_4$, $FeSO_4$, $BaSO_4$, $KHSO_4$, $K_2SO_4$, $(NH_4)_2SO_4$, $Al_2(SO_4)_3$, $Fe_2(SO_4)_3$, $Cr_2(SO_4)_3$, $Ca(NO_3)_2$, $Bi(NO_3)$, $Zn(NO_3)_2$, $Fe(NO_3)_3$, $CaCO_3$, $BPO_4$, $FePO_4$, $CrPO_4$, $Ti_3(PO_4)_4$, $Zr_3(PO_4)_4$, $Cu_3(PO_4)_2$, $Ni_3(PO_4)_2$, $AlPO_4$, $Zn_3(PO_4)_2$, $Mg_3(PO_4)_2$, $AlCl_3$, $TiCl_3$, $CaCl_2$, $AgCl_2$, $CuCl$, $SnCl_2$, $CaF_2$, $BaF_2$, $AgClO_4$, and $Mg(ClO_4)_2$. Depending on the synthesis conditions, these materials can be prepared as nonporous, microporous, mesoporous, or macroporous solids, as defined in the reference cited above. Conditions necessary to these preparations are known to those of ordinary skill in the art.

Non-limiting examples of solid acids can also include both natural and synthetic molecular sieves. Molecular sieves have silicate-based structures ("zeolites") and AlPO-based structures. Some zeolites are silicate-based materials which are comprised of a silica lattice and, optionally, alumina combined with exchangeable cations such as alkali or alkaline earth metal ions. For example, faujasites, mordenites, and pentasils are non-limiting illustrative examples of such silicate-based zeolites. These types of zeolites have 8-, 10-, or 12-membered ring zeolites, such as Y, beta, ZSM-5, ZSM-22, ZSM-48, and ZSM-57.

Other silicate-based materials suitable for use in practicing the present invention include zeolite bound zeolites as described in WO 97/45387, incorporated herein by reference in its entirety. These materials comprise first crystals of an acidic intermediate pore size first zeolite and a binder comprising second crystals of a second zeolite. Unlike zeolites bound with amorphous material such as silica or alumina to enhance the mechanical strength of the zeolite, the zeolite bound zeolite catalyst does not contain significant amounts of non-zeolitic binders.

The first zeolite used in the zeolite bound zeolite catalyst is an intermediate pore size zeolite. Intermediate pore size zeolites have a pore size of from about 5 to about 7 Å and include, for example, AEL, MFI, MEL, MFS, MEI, MTW, EUO, MTT, HEU, FER, and TON structure type zeolites. These zeolites are described in *Atlas of Zeolite Structure Types*, eds. W. H. Meier and D. H. Olson, Butterworth-Heineman, Third Edition, 1992, which is incorporated herein by reference in its entirety. Non-limiting, illustrative examples of specific intermediate pore size zeolites are ZSM-5, ZSM-11, ZSM-12, ZSM-22, ZSM-23, ZSM-34, ZSM-35, ZSM-38, ZSM-48, ZSM-50 AND ZSM-57. Preferred first zeolites are galliumsilicate zeolites having an MFI structure and aluminosilicate zeolites having an MFR structure.

The second zeolite used in the zeolite bound zeolite structure will usually have an intermediate pore size, preferably about 5.0 to about 5.5 Å, and have less activity than the first zeolite. Preferably, the second zeolite will be substantially non-acidic and will have the same structure type as the first zeolite. The preferred second zeolites are aluminosilicate zeolites having a silica to alumina mole ratio greater than 100 such as low acidity ZSM-5. If the second zeolite is an aluminosilicate zeolite, the second zeolite will generally have a silica to alumina mole ratio greater than 100:1, e.g., 500:1; 1,000:1, or more, and in some applications will contain no more than trace amounts of alumina. The second zeolite can also be silicalite, i.e., an MFI type substantially free of alumina, or silicalite 2, an MEL type substantially free of alumina. The second zeolite is usually present in the zeolite bound zeolite catalyst in an amount in the range of from about 10% to about 60% by weight based on the weight of the first zeolite and, more preferably, from about 20% to about 50% by weight.

The second zeolite crystals preferably have a smaller size than the first zeolite crystals and more preferably will have an average particle size from about 0.1 to about 0.5 microns. The second zeolite crystals, in addition to binding the first zeolite particles and maximizing the performance of the catalyst, will preferably intergrow and form an overgrowth which coats or partially coats the first zeolite crystals. Preferably, the crystals will be resistant to attrition.

The zeolite bound zeolite catalyst is preferably prepared by a three-step procedure. The first step involves the synthesis of the first zeolite crystals prior to converting it to the zeolite bound zeolite catalyst. Next, a silica-bound aluminosilicate zeolite can be prepared, preferably by mixing a mixture comprising the aluminosilicate crystals, a silica gel or sol, water and, optionally, an extrusion aid and, optionally, a metal component until a homogeneous composition in the form of an extrudable paste develops. The final step is the conversion of the silica present in the silica-bound catalyst to a second zeolite which serves to bind the first zeolite crystals together.

It is to be understood that the above description of zeolite bound zeolites can be equally applied to non-zeolitic molecular sieves (i.e., AlPO's).

Other molecular sieve materials suitable for this invention include aluminophosphate-based materials. Aluminophosphate-based (AlPO) materials are made of alternating $AlO_4$ and $PO_4$ tetrahedra. Members of this family have 8- (e.g., AlPO-12, -17, -21, -25, -34, -42), 10- (e.g., AlPO-11, 41.), or 12- (AlPO-5, -31) membered oxygen ring channels. Although $AlPO_4$s are neutral, substitution of Al and/or P by cations with lower charge introduces a negative charge in the framework, which is countered by cations imparting acidity.

Substitution of silicon for P and/or a P—Al pair turns the neutral binary composition (i.e., Al, P) into a series of acidic-ternary-composition (Si, Al, P) based SAPO materials, such as SAPO-5, -11, -14, -17, -18, -20, -31, -34, -41, and -46. Acidic ternary compositions can also be created by substituting divalent metal ions for aluminum, generating the MeAPO materials. Me is a metal ion which can be selected from the group consisting of, but not limited to, Mg, Co, Fe, Zn and the like. Acidic materials such as MgAPO (magnesium substituted), CoAPO (cobalt substituted), FeAPO (iron substituted), MnAPO (manganese substituted) ZnAPO (zinc substituted) and others belong to this category. Substitution can also create acidic quaternary-composition based materials such as the MeAPSO series, including FeAPSO (Fe, Al, P, and Si), MgAPSO (Mg, Al, P, Si), MnAPSO, CoAPSO, ZnAPSO, and more. Other substituted aluminophosphate-based materials include ElAPO and ElAPSO (where El=B, As, Be, Ga, Ge, Li, Ti, and others). As mentioned above, these materials have the appropriate acidic strength for reactions such as cracking. The more preferred aluminophosphate-based materials include 10- and 12-membered ring materials (for example, SAPO-11, SAPO-31, SAPO-41; MeAPO-11, MeAPO-31, MeAPO-41; MeAPSO-11, MeAPSO-31, MeAPSO-41; ElAPO-11, ElAPO-31, ElAPO-41; ElAPSO-11, ElAPSO-31, ElAPSO-41) which have significant olefin selectivity due to their channel structure.

Supported acid materials are either crystalline or amorphous materials, which may or may not be themselves acidic, modified to increase the acid sites on the surface. Non-limiting, illustrative examples are $H_2SO_4$, $H_3PO_4$, $H_3BO_3$, or $CH_2(COOH)_2$, mounted on silica, quartz, sand, alumina, or diatomaceous earth., as well as heteropolyacids mounted on silica, quartz, sand, alumina, or diatomaceous earth. Non-limiting, illustrative examples of crystalline supported acid materials are acid-treated molecular sieves, sulfated zirconia, tungstated zirconia, phosphated zirconia, and phosphated niobia.

Although the term "zeolites" includes materials containing silica and optionally, alumina, it is recognized that the silica and alumina portions may be replaced in whole or in part with other oxides. For example, germanium oxide, tin oxide, phosphorus oxide, and mixtures thereof can replace the silica portion. Boron oxide, iron oxide, gallium oxide, indium oxide, and mixtures thereof can replace the alumina portion. Accordingly, "zeolite" as used herein, shall mean not only materials containing silicon and, optionally, aluminum atoms in the crystalline lattice structure thereof, but also materials which contain suitable replacement atoms for such silicon and aluminum, such as gallosilicates, borosilicates, ferrosilicates, and the like.

Mesoporous solid acids can be ordered and non-ordered. Non-limiting examples of ordered mesoporous materials include pillared layered clays (PILC's) such as MCM-41 and MCM-48. Non-limiting examples of non-ordered mesoporous materials include silica and titania-based xerogels and aerogels.

The solid acid component can also be a conventional FCC catalyst including catalysts containing large-pore zeolite Y, modified zeolite Y, zeolite beta, and mixtures thereof, and catalysts containing a mixture of zeolite Y or modified zeolite Y and a medium-pore, shape-selective molecular sieve species such as ZSM-5 or modified ZSM-5, or a mixture of an amorphous acidic material and ZSM-5 or modified ZSM-5. Such catalysts are described in U.S. Pat. No. 5,318,692, incorporated by reference herein. The zeolite portion of the FCC catalyst particle will typically contain from about 5 wt. % to 95 wt. % zeolite-Y (or alternatively the amorphous acidic material) with the balance of the zeolite portion being ZSM-5. Useful medium-pore, shape-selective molecular sieves include zeolites such as ZSM-5, which is described in U.S. Pat. Nos. 3,702,886 and 3,770,614; ZSM-11 described in U.S. Pat. No. 3,709,979; ZSM-12 in U.S. Pat. No. 3,832,449; ZSM-21 and ZSM-38 in U.S. Pat. No. 3,948,758; ZSM-23 in U.S. Pat. No. 4,076,842; and ZSM-35 in U.S. Pat. No. 4,016,245. All of the above patents are incorporated herein by reference.

The large pore and shape selective zeolites may include "crystalline admixtures" which are thought to be the result of faults occurring within the crystal or crystalline area during the synthesis of the zeolites. Examples of crystalline admixtures of ZSM-5 and ZSM-11 are disclosed in U.S. Pat. No. 4,229,424, which is incorporated herein by reference. The crystalline admixtures are themselves medium pore, i.e., shape selective, size zeolites and are not to be confused with physical admixtures of zeolites in which distinct crystals or crystallites of different zeolites are physically present in the same catalyst composite or hydrothermal reaction mixtures.

The conventional FCC catalyst may contain other reactive or non-reactive components, such as the catalysts described in European patent EP0600686B1, incorporated by reference herein.

Metal-Based Component

The metal-based component consists of (a) at least one of oxygen and sulfur and (b) a metal combination selected from the group consisting of:
i) at least one metal from Group 3 and at least one metal from Groups 4–15 of the Periodic Table of the Elements;
ii) at least one metal from Groups 5–15 of the Periodic Table of the Elements, and at least one metal from at least one of Groups 1, 2, and 4 of the Periodic Table of the Elements;
iii) at least one metal from Groups 1 and 2, at least one metal from Group 3, and at least one metal from Groups 4–15 of the Periodic Table of the Elements; and
iv) two or more metals from Groups 4–15 of the Periodic Table of the Elements, wherein the at least one of oxygen and sulfur is chemically bound both within and between the metals. It is intended that reference to a metal from each of the noted Groups would include mixtures of metals from the respective groups. For example, reference to one or more metals from Groups 4–15 includes a mixture of chemically bound metals from Groups 4 and 15 of the Periodic Table.

While it is intended that the metal-based component consist essentially of the metals from the combination (sub-group) selected along with oxygen and/or sulfur, it is recognized that impurities may be present in the manufacturing process and that impurities from the hydrocarbon feedstocks may be adsorbed or incorporated into the crystalline structure of the metal-based component. To the extent that such impurities do not render the metal-based component ineffective for selective hydrogen combustion they shall be deemed to be within the scope of this invention.

For the purposes of description of the metal-based component of this invention, metals shall be deemed to include all elements classified as alkali metals, alkaline earth metals, transition metals, other metals, and metalloids, excluding hydrogen from Group 1; boron from Group 13; carbon and silicon from Group 14; and nitrogen, phosphorus, and arsenic from Group 15.

The preferred metals from Groups 1 and 2 are any of lithium, sodium, potassium, rubidium, cesium, beryllium, magnesium, calcium, strontium, and barium.

It is noted that rare earth elements are to be included as Group 3 metals. Preferably, the metal(s) from Group 3 are any of scandium, yttrium, lanthanum, cerium, praseodymium, neodymium, samarium, europium, gadolinium, terbium, dysprosium, holmium, erbium, thulium, ytterbium, and lutetium.

The metal(s) or element(s) from Groups 4–15 can be any metal element or a mixture of metal elements from Groups 4–15 of the Periodic Table of the Elements. Preferably, the metal(s) from Groups 4–15 is (are) at least one of titanium, vanadium, chromium, manganese, iron, cobalt, nickel, copper, zinc, aluminum, gallium, germanium, zirconium, niobium, molybdenum, ruthenium, rhodium, palladium, silver, indium, tin, antimony, hafnium, tantalum, tungsten, rhenium, iridium, platinum, gold, lead, and bismuth. More preferably, the metal(s) from Groups 4–15 is (are) at least one of titanium, manganese, iron, cobalt, nickel, copper, zinc, aluminum, gallium, germanium, zirconium, ruthenium, rhodium, palladium, silver, indium, tin, antimony, hafnium, rhenium, iridium, platinum, gold, and bismuth.

The catalyst can also include at least one of at least one support, at least one filler, and at least one binder.

In one embodiment of the present invention, the metal-based component is a combination of oxygen and/or sulfur with one or more metals from Group 3 and one or more metals from Groups 4–15 of the Periodic Table of the Elements (hereinafter "sub-group 1"). Within sub-group 1, the preferred metals from Group 3 are at least one of scandium, yttrium, lanthanum, cerium, samarium, ytterbium and praseodymium; and the preferred metals from Groups 4–15 are titanium, zirconium, niobium, molybdenum, tungsten, manganese, iron, cobalt, iridium, nickel, palladium, platinum, copper, zinc, aluminum gallium, indium, germanium, tin, antimony, and bismuth. Even more preferred metal(s) from Group 3 are at least one of scandium, yttrium, lanthanum, and praseodymium; and more preferred metals from Groups 4–15 are one or more of titanium, zirconium, manganese, iron, cobalt, nickel, copper, zinc, aluminum, indium, and tin.

Examples of combinations falling within sub-group 1 of the metal combinations are $Y_aIn_bZn_cMn_dO_{x\pm\delta}$, $La_aMn_bNi_cAl_dO_{x\pm\delta}$, $La_aMn_bAl_cO_{x\pm\delta}$, $Sc_aCu_bMn_cO_{x\pm\delta}$, $Sc_aZn_bMn_cO_{x\pm\delta}$, $La_aZr_bO_{x\pm\delta}$, $Mn_aSc_bO_{x\pm\delta}$, and $Pr_aIn_bZn_cO_{x\pm\delta}$, where a, b, c, and d are each between 0 and 1, the sum of a through d equals 1 to 3, x is the sum of a through d plus 1, and $\delta$ is the vacancy concentration or excess oxygen concentration. While oxygen is indicated in the formulae above, it will be recognized that the positions held by oxygen could be substituted with sulfur.

In an alternative embodiment of the present invention, the metal-based component is a combination of oxygen and/or sulfur with one or more metals from Groups 5–15 of the Periodic Table of the Elements and one or more metals from at least one of Groups 1, 2, and/or Group 4 of the Periodic Table of the Elements (hereinafter "sub-group 2"). Within sub-group 2, the preferred metals from Groups 5–15 are at least one of niobium, molybdenum, tungsten, manganese, iron, cobalt, iridium, nickel, palladium, platinum, copper, zinc, aluminum gallium, indium, germanium, tin, antimony, and bismuth; the preferred metals from Groups 1 and 2 are sodium, potassium magnesium, calcium, strontium, and barium; and the preferred metals from Group 4 are titanium and zirconium. Even more preferred metals from Groups 5–15 are, manganese, iron, cobalt, nickel, zinc, aluminum, indium, tin, antimony and bismuth.

Examples of combinations falling within sub-group 2 of the metal combinations are $K_aBa_bMn_cO_{x\pm\delta}$, $K_aMg_bMn_cO_{x\pm\delta}$, $Na_aMg_bMn_cO_{x\pm\delta}$, $Mn_aMg_bO_{x\pm\delta}$, $K_aSr_bMn_cO_{x\pm\delta}$, $In_aCa_bMn_cO_{x\pm\delta}$, $Bi_aCa_bMn_cCo_dO_{x\pm\delta}$, $Bi_aCa_bMn_cNi_dO_{x\pm\delta}$, $Ca_aMn_bSn_cCo_dO_{x\pm\delta}$, $In_aMg_bMn_cAl_dO_{x\pm\delta}$, $In_aZn_bMn_cAl_dO_{x\pm\delta}$, $Na_aBa_bMn_cO_{x\pm\delta}$, $Na_aCo_bMn_cO_{x\pm\delta}$, $Ca_aMn_bSb_cO_{x\pm\delta}$, $Ca_aMn_bCo_cAl_dO_{x\pm\delta}$, $Sr_aSb_bSn_cMg_dO_{x\pm\delta}$, $K_aCo_bMn_cO_{x\pm\delta}$, $Mn_aMg_bO_{x\pm\delta}$, $Ni_aMg_bMn_cO_{x\pm\delta}$, $Mn_aMg_bAl_cO_{x\pm\delta}$, $Mn_aMg_bTi_cO_{x\pm\delta}$, $Sr_aSb_bCa_cO_{x\pm\delta}$, $Sr_aTi_bSn_cAl_dO_{x\pm\delta}$, $Sr_aMn_bTi_cAl_dO_{x\pm\delta}$, $Ca_aMn_bO_{x\pm\delta}$, $Ca_aMn_bO_{x\pm\delta}$, $Ca_aZr_bAl_cO_{x\pm\delta}$, $Bi_aCa_bMn_cO_{x\pm\delta}$, $Bi_aSr_bCo_cFe_dO_{x\pm\delta}$, $Ba_aMn_bO_{x\pm\delta}$, $Ca_aMn_bAl_cO_{x\pm\delta}$, $Ca_aNa_bSn_cO_{x\pm\delta}$, and $Ba_aZr_bO_{x\pm\delta}$, where a, b, c, and d are each between 0 and 1, the sum of a through d equals 1 to 3, x is the sum of a through d plus 1, and $\delta$ is the vacancy concentration or excess oxygen concentration. While oxygen is indicated in the formulae above, it will be recognized that the positions held by oxygen could be substituted with sulfur.

In another alternative embodiment of the present invention, the metal-based component is a combination of oxygen and/or sulfur with one or more metals from Groups 1 and 2, one or more metals from Group 3, and one or more metals from Groups 4–15 of the Periodic Table of the Elements (hereinafter "sub-group 3"). Within sub-group 3, the preferred metals from Groups 1 and 2 are at least one of sodium, potassium, magnesium, calcium, strontium and barium; the preferred metals from Group 3 are at least one of scandium, yttrium, lanthanum, cerium, samarium, ytterbium and praseodymium; and the preferred metals from Groups 4–15 are at least one of titanium, zirconium, niobium, molybdenum, tungsten, manganese, iron, cobalt, iridium, nickel, palladium, platinum, copper, zinc, aluminum gallium, indium, germanium, tin, antimony, and bismuth. Even more preferred metals from Groups 1 and 2 are sodium, potassium, calcium, strontium and barium; from Group 3 are scandium, yttrium, and lanthanum; and from Groups 4–15 are titanium, manganese, iron, cobalt, nickel, copper, aluminum, gallium, tin and bismuth.

Examples of combinations falling within sub-group 3 of the metal combinations are $La_aCa_bMn_cCo_dTi_eO_{x\pm\delta}$, $La_aCa_bMn_cCo_dSn_eO_{x\pm\delta}$, $La_aCa_bCo_cO_{x\pm\delta}$, $La_aCa_bMn_cNi_dO_{x\pm\delta}$, $La_aCa_bMn_cCo_dSn_eO_{x\pm\delta}$, $La_aCa_bMn_cCo_dAl_eO_{x\pm\delta}$, $La_aCa_bMn_cCo_dO_{x\pm\delta}$, $Ba_aK_bBi_cLa_dO_{x\pm\delta}$, $La_aCa_bMn_cTi_dAl_eO_{x\pm\delta}$, $La_aCa_bCo_cNi_dAl_eO_{x\pm\delta}$, $La_aCa_bCo_cTi_dO_{x\pm\delta}$, $La_aCa_bMn_c$ $O_{x\pm\delta}$, $Ba_aBi_bLa_cO_{x\pm\delta}$, $La_aCa_bMn_cMg_dO_{x\pm\delta}$, $La_aCa_bMn_cFe_d$ $O_{x\pm\delta}$, $La_aSr_bCo_cAl_dO_{x\pm\delta}$, $Ba_aBi_bYb_cO_{x\pm\delta}$, $Ba_aBi_bSn_cLa_d$ $O_{x\pm\delta}$, $La_aCa_bMn_cGa_dO_{x\pm\delta}$, $La_aCa_bMn_cSn_dAl_eO_{x\pm\delta}$, $La_aCa_b$-$Mn_cCu_dO_{x\pm\delta}$, $La_aCa_bMn_cCo_dGa_eO_{x\pm67}$, $La_aCa_bMn_cAl_d$ $O_{x\pm\delta}$, $La_aCa_bCo_cAl_dO_{x\pm\delta}$, $Ba_aBi_bSn_cLa_d$ $O_{x\pm\delta}$, $La_aCa_bFe_c$-$Co_dO_{x\pm\delta}$, $La_aCa_bMn_cCo_dNi_eAl_fO_{x\pm\delta}$, $Y_aCa_bMn_cO_{x\pm\delta}$, $La_a$-$Ca_bFe_cCo_dO_{x\pm\delta}$, and $Sr_aNa_bSn_cY_dO_{x\pm\delta}$, where a, b, c, d, e and f are each between 0 and 1, the sum of a through f equals 1 to 3, x is the sum of a through f plus 1, and δ is the vacancy concentration or excess oxygen concentration. While oxygen is indicated in the formulae above, it will be recognized that the positions held by oxygen could be substituted with sulfur.

In yet another embodiment of the present invention, the metal-based component is a combination of oxygen and/or sulfur with two or more metals from Groups 4–15 of the Periodic Table of the Elements (hereinafter "sub-group 4"). Within sub-group 4, the preferred metals from Groups 4–15 are at least two of titanium, zirconium, niobium, molybdenum, tungsten, manganese, iron, cobalt, iridium, nickel, palladium, platinum, copper, zinc, aluminum gallium, indium, germanium, tin, antimony, and bismuth. Even more preferred are titanium, manganese, cobalt, copper, zinc, aluminum, and indium.

Examples of combinations falling within sub-group 4 of the metal combinations are $In_aCu_bMn_cO_{x\pm\delta}$, $Mn_aCo_bO_{x\pm\delta}$, $In_aZn_bMn_cAl_dO_{x\pm\delta}$, $In_aZn_bMn_cO_{x\pm\delta}$, $Mn_aZn_bO_{x\pm\delta}$, $Mn_aZn_b$ $Al_cO_{x\pm\delta}$, $In_aMn_bO_{x\pm\delta}$, $In_aMn_bAl_cO_{x\pm\delta}$, $In_aCu_bMn_cO_{x\pm\delta}$, and $Mn_aZn_bTi_cO_{x\pm\delta}$, where a, b, c, and d are each between 0 and 1, the sum of a through d equals 1 to 3, x is the sum of a through d plus 1, and δ is the vacancy concentration or excess oxygen concentration. While oxygen is indicated in the formulae above, it will be recognized that the positions held by oxygen could be substituted with sulfur.

The remaining component of the metal-based component in accordance with the invention is at least one of sulfur and oxygen. Oxygen is preferred. It is noted that at least a portion of the sulfur present in a metal-based component could be removed in the SHC reaction and replaced by oxygen in the regeneration process. It is also noted that in embodiments in which the hydrocarbon feed contained sulfur compounds, the metal-based component could have sulfur present in the structure. Therefore, it is likely that applications of this invention with sulfur-containing feedstock could involve a metal-based component containing both sulfur and oxygen regardless of which is used in the initial formulation of the metal-based component.

In a preferred embodiment the metal-based component can adopt a perovskite ($ABO_3$) crystal structure, a spinel ($AB_2O_4$) crystal structure, or a birnessite ($A_zBO_x$) crystal structure, where A and B are two distinct metal sites.

In an embodiment with a perovskite crystal structure, each metal site can comprise one or more metal cations. The crystal structure can be significantly distorted from the idealized cubic, perovskite structure depending on the choice of metals at A and B sites and/or due to the formation of oxygen vacancies upon reduction. In a preferred embodiment, the sum of a through n, in the sample compositions provided above is 2 and X is 3. The A sites in a perovskite structure are coordinated with 12 oxygen sites. The B sites in the structure would then be occupied by the remaining, generally smaller atoms, and are coordinated with 6 oxygen sites. Selection of A and B metal cations to optimize their relative sizes is desirable for maximum structural stability structure. Different metal cations can be substituted (or doped) at a particular site, and for stability it is desirable that the size of these cations be similar to the size of the cation being replaced. These criteria allow optimization of the selections within each of the desirable combinations of metals from selected Groups of the Periodic Table.

Stoichiometric perovskites (e.g., $A^{3+}B^{3+}O^{2-}_3$) have all metal and oxygen sites occupied, whereas non-stoichiometric perovskites (e.g., $A^{3+}_{1-x}A'^{2+}_xB^{3+}O^{2-}_{3-\delta}\square$) can exist with oxygen vacancies. Oxygen vacancy concentration (δ) is governed by charge-neutrality. These oxygen vacancies in the crystal structure provide one mechanism for solid-state diffusion of $O^{2-}$ ions in the crystal lattice. The $O^{2-}$ ions can "jump" or "hop" from occupied sites to vacant sites, and hence diffuse within the lattice. This vacancy hopping mechanism for $O^{2-}$ diffusion has been established in various metal oxide compounds.

The metals are preferably selected to optimize use of oxygen and/or sulfur from the lattice structure as indicated by the relationship below where the presence of reducible metal cations allow oxygen or sulfur to be removed from the lattice:

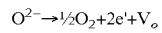

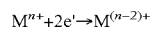

where $V_o$ denotes an oxygen vacancy formed due to oxygen being removed from the lattice, M is the reducible metal cation, and e is an electron (for a p-type material, holes instead of electrons would be used to denote charge-transfer), where sulfur (S) can be substituted for oxygen (O) throughout. If the metals forming the perovskite or spinel do not reduce, oxygen or sulfur will not be removed from the crystal lattice.

High oxygen diffusivity is necessary to allow $O^{2-}$ ions to diffuse from interior of metal oxide or sulfide particles to the surface where they can react with hydrogen. As stated above, oxygen diffusivity can be increased by creating oxygen vacancies, for example by replacing some of the trivalent La with divalent Ca in the crystal structure of $LaMnO_3$. In addition to oxygen mobility, electronic conductivity is also essential to allow electrons (or holes) to be transported away from (or to) the interface.

For the purposes of this invention, the metal-based component will preferably have low reactivity towards hydrocarbons. Combinations of metals may be selected to optimize the properties for a given application. Lower molecular weight materials are generally preferred for the economic benefit of greater oxygen capacity for a given mass of material to be used in the catalyst system.

Preferred crystal structures for the metal-based component would demonstrate an ability to sustain oxygen vacancies in crystal structure. Perovskites can accommodate a large vacancy concentration (δ) as large as 0.5 or higher without phase decomposition. This phase stability allows for reversible oxygen and/or sulfur removal from and addition to the metal-based component.

Another preferred crystal structure is the spinel ($AB_2O_4$) structure where A and B represent two distinct metal cation sites, where "B" is octahedrally coordinated to 6 oxygen sites and "A" is tetrahedrally coordinated to 4 oxygen sites.

Another preferred structure is the birnessite ($A_zBO_x$) crystal structure, which generally contains layered manganese oxide ($MnO_6^{2-}$) octahedra sheets with "A" cations, typically Group 1 or Group 2 metal ions, incorporated between $MnO_6$ layers to balance the negative charge on the sheets. Differing amount of hydration water can also be incorporated between these layers. The birnessite structure can be synthesized along with the spinel structure, and has been observed to transform to a spinel structure. High-temperature stability of birnessite, and its transformation to spinel structure, appears to depend on selection of the stabilizing cation. For example, birnessite structures containing potassium appear to be more stable than those containing sodium.

It is anticipated that other crystalline structures could also be used to provide a metal-based component capable of surrendering oxygen to a hydrogen combustion reaction.

The metal-based component could be prepared, by way of non-limiting example, by combining salts or chalcogenides (compounds of the Group 16 elements) containing the desired parts through such means as evaporation or precipitation, optionally followed by calcination. The solid acid component is then physically mixed or chemically reacted with the metal-based component and, optionally, combined with a binder to form catalyst particles.

The metal-based component can be obtained through chemical means, such as the combination of metal salts and/or chalcogenides, in solution or slurry, followed by removal of the solvent or mother liquor via evaporation or filtration and drying. Various methods for synthesizing particular compounds are known in the art. The metal-based component can then be ground and calcined. The solid acid and metal-based components can be physically admixed by mechanical mixing.

The solid acid component and the metal-based component of the catalyst system in accordance with the present invention can be chemically bound. The chemically bound materials can then be subjected to the treatment of a matrix component. The matrix component serves several purposes. It can bind the solid acid component and the metal-based component to form catalyst particles. It can serve as a diffusion medium for the transport of feed and product molecules. It can also act as a filler to moderate the catalyst activity. In addition, the matrix can help heat transfer or serve as a sink or trap for metal contaminants in the feedstock.

Examples of typical matrix materials include amorphous compounds such as silica, alumina, silica-alumina, silica-magnesia, titania, zirconia, and mixtures thereof. It is also preferred that separate alumina phases be incorporated into the inorganic oxide matrix. Species of aluminum oxyhydroxides-γ-alumina, boehmite, diaspore, and transitional aluminas such as α-alumina, β-alumina, γ-alumina, δ-alumina, ε-alumina, κ-alumina, and ρ-alumina can be employed. Preferably, the alumina species is an aluminum trihydroxide such as gibbsite, bayerite, nordstrandite, or doyelite. The matrix material may also contain phosphorous or aluminum phosphate. The matrix material may also contain clays such as halloysite, kaolinite, bentonite, attapulgite, montmorillonite, clarit, fuller's earth, diatomaceous earth, and mixtures thereof. The weight ratio of the solid acid component and the metal-based component to the inorganic oxide matrix component can be about 100:1 to 1:100.

In another aspect of the present invention, the solid acid component and the metal-based component of catalysts in accordance with the present invention may be treated separately with a matrix component. The matrix component for the solid acid component can be the same as or different from that for the metal-based component. One of the purposes of the treatment is to form particles of the solid acid component and particles of the metal-based component so that the components are hard enough to survive interparticle and reactor wall collisions. The matrix component may be made according to conventional methods from an inorganic oxide sol or gel, which is dried to "glue" the catalyst particle's components together. The matrix component can be catalytically inactive and comprises oxides of silicon, aluminum, and mixtures thereof. It is also preferred that separate alumina phases be incorporated into the inorganic oxide matrix. Species of aluminum oxyhydroxides-γ-alumina, boehmite, diaspore, and transitional aluminas such as α-alumina, β-alumina, γ-alumina, δ-alumina, ε-alumina, κ-alumina, and ρ-alumina can be employed. Preferably, the alumina species is an aluminum trihydroxide such as gibbsite, bayerite, nordstrandite, or doyelite. The matrix material may also contain phosphorous or aluminum phosphate. The matrix material may also contain clays such as kaolinite, bentonite, attapulgite, montmorillonite, clarit, fuller's earth, diatomaceous earth, and mixture thereof.

The weight ratio of the solid acid component to the matrix component can be about 100:1 to 1:100. The weight ratio of the metal-based component to the matrix component can be about 100:1 to 1:100.

The solid-acid component particles and the metal-based component particles may be mixed to form a uniform catalyst system in the reactor or be packed in series to form a staged catalyst system in either a single reactor or two or more staged reactors.

The catalyst system of the present invention is multifunctional in that it both cracks a hydrocarbon feedstream and selectively combusts the hydrogen produced from the cracking reaction. The solid acid component of the catalyst system performs the cracking function and the metal-based component of the catalyst system performs the selective hydrogen combustion function. The catalyst system is particularly well-suited for cracking hydrocarbons to light olefins and gasoline. Conventional catalytic cracking generates hydrogen amongst other cracked products, which makes products recovery more difficult and costly. The catalyst system of the present invention can perform hydrocarbon cracking with reduced co-production of hydrogen thereby reducing the investment and operating costs and/or creating more equipment volume for higher production capacity.

In accordance with the present invention, a catalyst system comprises a hydrocarbon cracking component and a selective hydrogen combustion component, which catalyst system, upon contact with a hydrocarbon feedstream, almost simultaneously cracks the hydrocarbon and selectively combusts the hydrogen produced from the cracking reaction. It is preferred that selective hydrogen combustion is conducted via an anaerobic mechanism which is related to the use of lattice oxygen from the selective hydrogen combustion component to promote selective hydrogen combustion.

In accordance with the present invention, the hydrogen produced from the cracking reaction is selectively combusted or converted to water (or steam). There are several ways to utilize the benefits of converting the hydrogen product into condensable water.

It is believed that the inventive catalyst system is unique in that, among other things, it permits simultaneous catalytic cracking of hydrocarbon feedstreams to cracked products and combustion of resultant hydrogen to water. Preferably, the hydrogen combustion comprises selective hydrogen combustion. The selective hydrogen combustion can be anaerobic without the feeding of free-oxygen containing gas to the reaction, or it can be conducted with the feeding of free-oxygen containing gas.

Preferably, the yield of hydrogen is less than the yield of hydrogen when contacting said hydrocarbon feedstream(s) with said solid acid component alone under said catalytic reaction conditions. Preferably, the yield of hydrogen is at least 10% less than the yield of hydrogen when contacting said hydrocarbon feedstream(s) with said solid acid component alone under catalytic reaction conditions. More preferably, the yield of hydrogen is at least 25% less, more preferably at 50% less, even more preferably at least 75%, yet more preferably at least 90%, and most preferably greater than 99% less than the yield of hydrogen when contacting said hydrocarbon feedstream(s) with said solid acid component alone under catalytic reaction conditions.

Typically the products from a cracking process are discharged from the cracking reactor to pass through a quench tower and a main fractionation column, producing one or more than one liquid streams and a vapor stream containing light gases such as hydrogen, methane, ethylene, ethane, propylene, propane, butylenes, and butanes. The vapor stream is compressed in one or more than one compressor and charged to a series of fractionation columns for product recovery and purification. For example, current FCC technology typically produces vapor streams containing mixtures of hydrogen, light paraffins (e. g. methane, ethane, propane, and butanes) and light olefins (e. g. ethylene, propylene, and butylenes), and liquid streams containing naphtha, gasoline, cycle oils, and heavier products. The product streams will go to a main fractionator where gasoline and lighter streams are recovered in the overhead and the heavier streams go to the bottom. The overhead products are compressed and are often separated into C2− and C3+ products. Hydrogen usually is not a desirable product due to the difficulty of separating it from the ethylene and propylene. In addition, due to its low molecular weight, the presence of even a moderate quantity of $H_2$ in cracked products would consume a significant fraction of the gas compressors' and the fractionators' volumetric capacities, which frequently become the bottlenecks for existing FCC units' processing of light hydrocarbons. Converting the hydrogen product into water, which can be condensed and separated in the quench tower or the main fractionator, therefore, debottlenecks the compressors and/or the fractionators by freeing up the space that would be occupied by the hydrogen. Such newly created space in the compressors and/or the fractionators could be used to increase the production of more desirable products such as light olefins. Increased production of light olefins could be accomplished by using higher concentrations of the ZSM-5 additive (or other olefin-selective additives) in the FCC cracking catalysts.

Alternatively, at a constant production level, converting hydrogen to water can reduce the number or the size of equipment, thereby reducing the investment costs.

Selective hydrogen combustion could also help supply the heat required for hydrocarbon cracking. The combustion of hydrogen is highly exothermic and, therefore, would be an ideal internal source of heat supply. This could reduce the need for external heat.

Thus, in accordance with the present invention, a catalytic cracking process comprises contacting a hydrocarbon feedstream with a catalyst system comprising a cracking/selective hydrogen combustion catalyst under suitable catalytic cracking/selective hydrogen combustion conditions to produce olefins, gasoline, and other cracked products, wherein the catalytic cracking is conducted with a reduction of added heat. Added heat can be reduced by at least 2%, preferably by over 5%, and even more preferably by over 10% by using the catalyst system of the present invention. Since cracking reactions are endothermic, the required heat input is simply the overall enthalpy of the reaction. Thus, it is within the skill of one of ordinary skill in the art to calculate the required heat input.

In accordance with the present invention, a free-oxygen containing gas such as air or pure oxygen can be used as the source of oxygen for the selective hydrogen combustion reaction. The free-oxygen containing gas can be co-fed into the reaction vessel(s) with the hydrocarbon feedstream. Preferably, the lattice oxygen in the metal-based component of the catalyst system is used as the source of oxygen for the selective hydrogen combustion reaction (anaerobic hydrogen combustion). Higher hydrogen combustion selectivity and less $CO_x$ by-product are achievable using this approach as compared to co-feeding oxygen to the reactor. Using continuous catalyst regeneration technology would overcome the potential problem related to lattice oxygen being quickly consumed with resultant loss of catalyst activity.

The inventive process can be performed using any known reactor. By way of non-limiting, illustrative example, fixed-bed reactors with catalyst regeneration, moving bed reactors with catalyst regeneration such as the continuous catalyst regeneration reactor (also known as CCR), fluidized-bed processes such as a riser reactor with catalyst regeneration and the like would be suitable. A non-limiting illustrative example of a suitable fixed-bed catalyst regeneration system is illustrated in U.S. Pat. No. 5,059,738 to Beech, Jr. et al, which is incorporated herein by reference in its entirety. A non-limiting illustrative example of a suitable continuous catalyst regeneration moving bed reactor is illustrated in U.S. Pat. No. 5,935,415 to Haizmann et al, which is incorporated herein by reference in its entirety. A preferred reactor system would be a downer-regenerator or a riser-regenerator system as described below for illustration purposes only. A riser-regenerator system that would be suitable for use in practicing the inventive process is disclosed in U.S. Pat. No. 5,002,653, which is incorporated herein by reference in its entirety.

In a riser-regenerator system, pre-heated hydrocarbon feed is contacted with catalyst in a feed riser line wherein the reaction primarily takes place. The temperature and pressure for the riser/reactor can be in the range of about 300 to about 800° C. and 0.1–10 atmospheres (10–1000 kPa), respectively. The catalyst to hydrocarbon feed ratio, weight basis, can be in the range of 0.01 to 1000. The residence time in the reaction zone can be in the range of 0.01 second to 10 hours. As the reactions progress, the catalyst system is progressively deactivated by consumption of lattice oxygen and the formation of coke on the catalyst surface. The catalyst system and hydrocarbon vapors are separated mechanically and hydrocarbons remaining on the catalyst are removed by steam stripping before the catalyst system enters a catalyst regenerator. The hydrocarbon vapors are taken overhead to a series of fractionation towers for product separation. Spent catalyst system is reactivated in the regenerator by burning off coke deposits with air. The coke burn also serves as an oxidation treatment to replenish the catalyst system's lattice oxygen consumed in the reactor. The temperature and pressure for the regenerator can be in the range of about 300 to about 800° C. and 0.1–10 atmospheres (10–1000 kPa), respectively. As required, a small amount of fresh make-up catalyst can be added to the reactor or, preferably, to the regenerator, where it can be preheated prior to entering the reactor.

The cracking process of the present invention may also be performed in one or more conventional FCC process units under conventional FCC conditions in the presence of the catalyst system of this invention. Each unit comprises a riser reactor having a reaction zone, a stripping zone, a catalyst regeneration zone, and at least one fractionation zone. The feed is conducted to the riser reactor where it is injected into the reaction zone wherein the heavy feed contacts a flowing source of hot, regenerated catalyst. The hot catalyst vaporizes and cracks the feed and selectively combusts the resultant hydrogen at a temperature from about 475° C. to about 650° C., preferably from about 500° C. to about 600° C. The cracking reaction deposits carbonaceous hydrocarbons, or coke, on the catalyst system and the selective hydrogen combustion reaction depletes the lattice oxygen, thereby deactivating the catalyst system. The cracked products may be separated from the deactivated catalyst system and a portion of the cracked products may be fed to a fractionator. The fractionator generally separates at least a naphtha fraction from the cracked products.

The deactivated catalyst system flows through the stripping zone where volatiles are stripped from the catalyst particles with a stripping material such as steam. The stripping may be performed under low severity conditions in order to retain absorbed hydrocarbons for heat balance through combustion in the regenerator. The stripped catalyst is then conducted to the regeneration zone where it is regenerated by burning coke on the catalyst system and oxidizing the oxygen-depleted metal-based catalyst component in the presence of an oxygen containing gas, preferably air. Decoking and oxidation restore catalyst activity and simultaneously heat the catalyst system to, e.g., 650° C. to 800° C. The hot catalyst is then recycled to the riser reactor at a point near or just upstream of the second reaction zone. Flue gas formed by burning coke in the regenerator may be treated for removal of particulates and for conversion of carbon monoxide, after which the flue gas is normally discharged into the atmosphere.

It has been observed that the flue gas resulting from regeneration of the catalyst system described herein contains less $NO_x$ than the flue gas resulting from regeneration of a cracking catalyst alone. Multiple mechanisms are believed to contribute to this environmentally beneficial effect. The reduced metal-based component is believed to react with $NO_x$ resulting in removal of oxygen from the $NO_x$ while the lattice oxygen in the metal-based component is replenished. Additionally, the metal-based components appear to adsorb some portion of $NO_x$, carrying it into the reactor where it reacts with hydrogen to form water and ammonia, both of which are easily removed from the products in the quench step.

Without being limited to any single theory, the materials disclosed herein are believed to activate $NO_x$ by adsorption, allowing for $NO_x$ conversion to $N_2$. The presence of surface oxygen vacancies and redox sites on the preferred crystal structures, and basicity of these metal oxide and sulfide compounds are likely reasons for high $NO_x$ activation.

Use of the metal-based component in conjunction with regeneration of coked catalyst would be expected to result in a reduction of $NO_x$ emissions in the flue gas. Preferably, the reduction would be at least 10 percent, more preferably greater than 25 percent, even more preferably greater than 50 percent, yet more preferably greater than 75 percent, and most preferably greater than 90 percent.

The feed may be cracked in the reaction zone under conventional FCC conditions in the presence of the catalyst system of this invention. Preferred process conditions in the reaction zone include temperatures from about 475° C. to about 650° C., preferably from about 500° C. to 600° C.; hydrocarbon partial pressures from about 0.5 to about 3.0 atmospheres (50–300 kPa), preferably from about 1.0 to about 2.5 atmospheres (100–250 kPa); and a catalyst to feed (wt/wt) ratio from about 1 to about 30, preferably from about 3 to about 15; where catalyst weight is total weight of the catalyst composite. Though not required, it is also preferred that steam be concurrently introduced with the feed into the reaction zone, with the steam comprising up to about 15 wt. %, and preferably ranging from about 1 wt. % to about 5 wt. % of the feed. Also, it is preferred that the feed's residence time in the reaction zone be less than about 100 seconds, for example from about 0.01 to about 60 seconds, preferably from about 0.1 to about 30 seconds.

In accordance with the present invention, the weight ratio of solid acid component to the total weight of metal-based component is from 1000:1 to 1:1000. More preferably, the ratio is from 500:1 to 1:500. Most preferably, the ratio is from 100:1 to 1:100. This ratio can be adjusted and optimized for a given feedstock and desired product slate by adjusting the make-up rates of the individual components in the catalyst system.

EXAMPLES

The invention is illustrated in the following non-limiting examples, which are provided for the purpose of representation, and are not to be construed as limiting the scope of the invention. All parts and percentages in the examples are by weight unless indicated otherwise.

Further, with respect to the chemical formulas for the metal-based components presented in the examples, the numbering represents the molar relationships of the elements in the synthesis mixture rather than the molar ratios of the elements in the resulting metal oxide/sulfide. It is anticipated that multiple crystalline structures could actually coexist within the resulting metal-based component. For example the metal-based component represented as $LaMn_{0.4}Ni_{0.4}Al_{0.2}O_x$ was prepared from a mixture of solutions containing lanthanum in a ratio of 1:0.4 with manganese, a ratio of 1:0.4 with nickel, and a ratio of 1:0.2 with aluminum. The subscript x on the oxygen component is indicative of the oxygen being sufficient to balance the valences of the resulting compound, including the resulting vacancies and/or oxygen excess.

Example 1 (Comparative)

This example illustrates the hydrogen yield during hydrocarbon cracking using a conventional zeolitic catalyst, without the addition of selective hydrogen combustion (SHC) catalyst. 4.0 grams of OlefinsMax (Grace Davison Division of W. R. Grace & Co.) were pelletized, crushed, and screened to 30–50 mesh particles. It was then steamed at 700° C. for 2 hours. 1.0 gram of steamed OlefinsMax was then physically mixed with 2.5 grams of 16–25 mesh silicon carbide (SiC), an inert solid used to fill the volume of the test reactor, and loaded into a fixed-bed reactor for testing. The catalyst was heated to 540° C. in a helium stream at a flow rate of 105 cm³/min and a pressure of 2–4 psig (14–28 kPa). The temperature was allowed to stabilize for 30 minutes prior to the addition of hydrocarbon feed. The feed consisted of 0.384 cm³/min of 2-methylpentane and 0.025 cm³/min of liquid water. Following the introduction of hydrocarbon feed, product samples were collected every 30 seconds for a total time-period of 3.5 minutes using a multi-port, gas-sampling valve. The product was analyzed using a gas chromatograph equipped with flame ionization and pulsed discharge detectors. Table 1 shows the hydrogen and combined yield of $C_1$–$C_4$ products at various conversions of 2-methylpentane. When LVN was used as feed, similar hydrogen and $C_1$–$C_4$ yields were obtained when compared at the same feed conversion. A small $CO_x$ yield (typically, <0.1 wt %) was observed due to background contamination and/or hydrocarbon oxidation during post-reaction sampling/analysis. The yield observed in the comparison reaction was deducted from the yield observed in the test reactions prior to reporting.

TABLE 1

| 2-Methylpentane Conversion | $C_1$–$C_4$ Yield (wt %) | Hydrogen Yield (wt %) |
|---|---|---|
| 39.2 | 33.3 | 0.230 ± 0.012 |
| 21.1 | 18.6 | 0.131 ± 0.007 |
| 8.1 | 6.7 | 0.044 ± 0.002 |

Examples Comprising Metals from Sub-Group 1

Example 2

This example illustrates the preparation and performance of selective hydrogen combustion (SHC) catalyst for reducing the hydrogen yield in the product, while minimizing non-selective hydrocarbon oxidation. $La_aMn_bNi_cAl_dO_x$ catalyst was prepared by co-precipitation of metal salts using an organic base and a carbonate precursor. Solution A was prepared by dissolving 9.106 grams of lanthanum nitrate hexahydrate (Aldrich Chemical Company, Milwaukee, Wis.), 1.059 grams of manganese (II) chloride (Aldrich Chemical Company, Milwaukee, Wis.), 2.446 grams of nickel nitrate hexahydrate (Aldrich Chemical Company, Milwaukee, Wis.), and 1.578 grams of aluminum nitrate nonahydrate (Aldrich Chemical Company, Milwaukee, Wis.) in 210 grams of deionized water. Solution B was prepared by dissolving 13.3 grams of sodium bicarbonate (Mallinckrodt Baker Inc., Paris, Ky.) and 39.8 grams of tetraethylammonium hydroxide, 35 wt % solution (Alfa Aesar, Ward Hill, Mass.) in 631 grams of deionized water. Solution A was slowed poured into a well-stirred solution B, resulting in precipitate formation. After aging the suspension for 1 hour, the particles were recovered by centrifugation at 1500–2000 rpm. The precipitate was then resuspended in 250 mL of isopropanol (VWR Scientific Products Corporation, Chicago, Ill.) followed by centrifugation to remove water along with impurity cations/anions. This washing step was repeated. The precipitate was dried in air at 25° C., ground to a fine powder using a mortar and pestle, and calcined to 800° C. for 2 hours in air. The sample was pelletized, crushed, and screened to 30–50 mesh prior to SHC testing.

1.0 grams of steamed OlefinsMax (prepared as described in Example 1) was physically mixed with 0.5 grams of SHC catalyst and 2.0 gram of SiC, and loaded into a fixed bed reactor. All other testing conditions were kept the same as in Example 1. Table 2 shows the results of the SHC test.

The data in Table 2 demonstrates that significant reductions in hydrogen yield can be achieved through the addition of SHC catalyst. Compared to Example 1, there is a 53 percent reduction in hydrogen yield at similar hydrocarbon conversion and $C_1$–$C_4$ yields. Moreover, the SHC catalyst exhibits a high selectivity of 81 percent for hydrogen combustion, resulting in minimal $CO_x$ formation through non-selective hydrocarbon activation.

Example 3

This example illustrates the preparation and performance of selective hydrogen combustion (SHC) catalyst for reducing the hydrogen yield in the product, while minimizing non-selective hydrocarbon oxidation. $Sc_aCu_bMn_cO_x$ catalyst was prepared by co-precipitation of metal salts using an organic base in an alcohol medium. Solution A was prepared by dissolving 3.642 grams of scandium nitrate hydrate (Alfa Aesar, Ward Hill, Mass.), 0.323 grams of copper (II) nitrate hydrate (Alfa Aesar, Ward Hill, Mass.), 1.681 grams of manganese (II) chloride (Aldrich Chemical Company, Milwaukee, Wis.) in 67 grams of deionized water. Solution B was prepared by dissolving 58 grams of tetraethylammonium hydroxide, 35 wt % solution (Alfa Aesar, Ward Hill, Mass.) in 225 grams of isopropanol (VWR Scientific Products Corporation, Chicago, Ill.). Solution A was slowly poured into a well-stirred solution B, resulting in precipitate formation. After aging the suspension for 1 hour, the particles were recovered by centrifugation at 1500–2000 rpm. The precipitate was then resuspended in 250 mL of isopropanol followed by centrifugation to remove water along with impurity cations/anions. This washing step was repeated. The precipitate was dried in air at 25° C., ground to a fine powder using a mortar and pestle, and calcined to 800° C. for 2 hours in air. The sample was pelletized, crushed, and screened to 30–50 mesh prior to SHC testing.

1.0 grams of steamed OlefinsMax (prepared as described in Example 1) was physically mixed with 0.5 grams of SHC catalyst and 2.0 gram of SiC, and loaded into a fixed bed reactor. All other testing conditions were kept the same as in Example 1. Table 2 shows the results of the SHC test.

TABLE 2

| | SHC Catalyst | |
|---|---|---|
| | $LaMn_{0.4}Ni_{0.4}Al_{0.2}O_3$ | $Sc_{0.9}Cu_{0.1}MnO_3$ |
| % Conversion | 7.7 | 8.0 |
| $C_1$–$C_4$ Yield (wt %) | 6.7 | 6.7 |
| $H_2$ Yield (wt %) | 0.021 | 0.023 |
| % $H_2$ Conversion | 53 | 48 |
| $CO_x$ Yield (wt %) | 0.055 | 0.174 |
| % $H_2$ Selectivity | 81 | 67 |

The data in Table 2 demonstrates that significant reductions in hydrogen yield can be achieved through the addition of SHC catalyst. Compared to Example 1, there is a 48 percent reduction in hydrogen yield at similar hydrocarbon conversion and $C_1$–$C_4$ yields. Moreover, the SHC catalyst exhibits a selectivity of 67 percent for hydrogen combustion, resulting in minimal $CO_x$ formation through non-selective hydrocarbon activation.

Example 4

Table 3 shows the performance of additional combinations of sub-group 1 SHC catalysts with the cracking catalyst of Example 1. All tests were run at the conditions described in Example 1 with 0.5 grams of the SHC catalyst being tested mixed with 2.0 grams of SiC and either 1.0 grams of steamed OlefinsMax or 0.5 grams of fresh OlefinsMax.

TABLE 3

| Catalyst Composition | % H$_2$ Conversion | % H$_2$ Selectivity |
|---|---|---|
| Y$_{0.2}$In$_{0.6}$Zn$_{0.2}$MnO$_3$ | 84.2 | 100 |
| LaMn$_{0.4}$Ni$_{0.4}$Al$_{0.2}$O$_3$ | 69.1 | 91 |
| La$_{0.9}$Mn$_{0.8}$Al$_{0.2}$O$_3$ | 41.4 | 100 |
| Sc$_{0.9}$Cu$_{0.1}$MnO$_3$ | 53.8 | 55 |
| Sc$_{0.8}$Zn$_{0.2}$MnO$_3$ | 55.6 | 34 |
| Zr$_{0.6}$La$_{0.4}$O$_2$ | 10.7 | 100 |
| La$_{0.05}$—Zr$_{0.95}$O$_2$ | 11.6 | 90 |
| Mn$_{0.9}$Sc$_{0.1}$O$_2$ | 15.0 | 27 |
| Pr$_{0.7}$In$_{0.2}$Zn$_{0.1}$O$_2$ | 14.3 | 20 |

Examples Comprising Metals from Sub-Group 2

Example 5

This example illustrates the preparation and performance of selective hydrogen combustion (SHC) catalyst for reducing the hydrogen yield in the product, while minimizing non-selective hydrocarbon oxidation. In$_{0.8}$Ca$_{0.2}$MnO$_3$ catalyst was prepared by co-precipitation of metal salts using an organic base and a carbonate precursor. Solution A was prepared by dissolving 6.289 grams of indium nitrate hydrate (Alfa Aesar, Ward Hill, Mass.), 1.164 grams of calcium nitrate tetrahydrate (Alfa Aesar, Ward Hill, Mass.), and 7.018 grams of manganese (II) nitrate hydrate (Aldrich Chemical Company, Milwaukee, Wis.) in 247 grams of deionized water. Solution B was prepared by dissolving 15.0 grams of sodium bicarbonate (Mallinckrodt Baker Inc., Paris, Ky.), 45.1 grams of tetraethylammonium hydroxide, 35 wt % solution (Alfa Aesar, Ward Hill, Mass.) in 715 grams of deionized water. Solution A was slowed poured into a well-stirred solution B, resulting in precipitate formation. After aging the suspension for 1 hour, the particles were recovered by centrifugation at 1500–2000 rpm. The precipitate was then resuspended in 250 mL of isopropanol (VWR Scientific Products Corporation, Chicago, Ill.) followed by centrifugation to remove water, impurity cations/anions. This washing step was repeated. The precipitate was dried in air at 25° C., ground to a fine powder using a mortar and pestle, and calcined to 800° C. for 2 hours in air. The sample was pelletized, crushed, and screened to 30–50 mesh prior to SHC testing.

1.0 grams of steamed OlefinsMax (prepared as described in Example 1) was physically mixed with 0.5 grams of SHC catalyst and 2.0 gram of SiC, and loaded into a fixed bed reactor. All other testing conditions were kept the same as in Example 1. Table 4 shows the results of the SHC test.

The data in Table 4 demonstrates that significant reductions in hydrogen yield can be achieved through the addition of SHC catalyst. Compared to Example 1, there is a 92 percent reduction in hydrogen yield at similar hydrocarbon conversion and C1–C4 yields. Moreover, the SHC catalyst exhibits a high selectivity of 85 percent for hydrogen combustion, resulting in minimal CO$_x$ formation through non-selective hydrocarbon activation.

Example 6

This example illustrates the preparation and performance of selective hydrogen combustion (SHC) catalyst for reducing the hydrogen yield in the product, while minimizing non-selective hydrocarbon oxidation. Bi$_{0.4}$Ca$_{0.6}$Mn$_{0.6}$Ni$_{0.4}$O$_3$ catalyst was prepared by co-precipitation of metal salts using an organic base in an alcohol medium. Solution A was prepared by adding 5 mL of concentrated nitric acid to 50 mL of deionized water. 4.574 grams of bismuth nitrate pentahydrate (Aldrich Chemical Company, Milwaukee, Wis.) were added to this solution and stirred for 10 minutes to allow complete dissolution. 3.341 grams of calcium nitrate tetrahydrate (Alfa Aesar, Ward Hill, Mass.), 4.027 grams of manganese (II) nitrate hydrate (Aldrich Chemical Company, Milwaukee, Wis.), 2.742 of nickel (II) nitrate hexahydrate (Aldrich Chemical Company, Milwaukee, Wis.) and 107 grams of deionized water were then added and dissolved in solution A. Solution B was prepared by dissolving 98 grams of tetraethylammonium hydroxide, 35 wt % solution (Alfa Aesar, Ward Hill, Mass.) in 534 grams of isopropanol (VWR Scientific Products Corporation, Chicago, Ill.). Solution A was slowed poured into a well-stirred solution B, resulting in precipitate formation. After aging the suspension for 1 hour, the particles were recovered by centrifugation at 1500–2000 rpm. The precipitate was then resuspended in 250 mL of isopropanol followed by centrifugation to remove water, impurity cations/anions. The precipitate was dried in air at 25° C., ground to a fine powder using a mortar and pestle, and calcined to 750° C. for 2 hours in air. The sample was pelletized, crushed, and screened to 30–50 mesh prior to SHC testing.

1.0 grams of steamed OlefinsMax (prepared as described in Example 1) was physically mixed with 0.5 grams of SHC catalyst and 2.0 gram of SiC, and loaded into a fixed bed reactor. All other testing conditions were kept the same as in Example 1. Table 4 shows the results of the SHC test.

The data in Table 4 demonstrate that significant reductions in hydrogen yield can be achieved through the addition of SHC catalyst. Compared to Example 1, there is an 83 percent reduction in hydrogen yield at similar hydrocarbon conversion and C1–C4 yields. Moreover, the SHC catalyst exhibits a high selectivity of 80 percent for hydrogen combustion, resulting in minimal CO$_x$ formation through non-selective hydrocarbon activation.

Example 7

This example illustrates the preparation and performance of selective hydrogen combustion (SHC) catalyst for reducing the hydrogen yield in the product, while minimizing non-selective hydrocarbon oxidation. Ca$_{0.6}$Na$_{0.4}$SnO$_3$ catalyst was prepared by co-precipitation of metal salts using an organic base in an alcohol medium. Solution A was prepared by adding 5 mL of concentrated nitric acid to 50 mL of deionized water. 13.151 grams of tin chloride pentahydrate (Alfa Aesar, Ward Hill, Mass.) were added to this solution and stirred for 10 minutes to allow complete dissolution. 5.315 grams of calcium nitrate tetrahydrate (Alfa Aesar, Ward Hill, Mass.) and 260 grams of deionized water were then added and dissolved in solution A. Solution B was prepared by dissolving 164 grams of tetraethylammonium hydroxide, 35 wt % solution (Alfa Aesar, Ward Hill, Mass.) in 637 grams of isopropanol (VWR Scientific Products Corporation, Chicago, Ill.). Solution A was slowed poured into a well-stirred solution B, resulting in precipitate formation. After aging the suspension for 1 hour, the particles were recovered by centrifugation at 1500–2000 rpm. The precipitate was then resuspended in 250 mL of isopropanol followed by centrifugation to remove water, impurity cations/anions. A 0.07295 g Na/g solution was prepared by dissolving NaOH (Mallinckrodt Baker Inc., Paris, Ky.) in deionized water. 7.40 grams of NaOH solution and 100 mL of ethanol (Alfa Aesar, Ward Hill, Mass.) were added to the precipitate, and stirred to obtain a homogenous suspension. The suspension was heated to 90° C. to evaporate the ethanol, ground using a mortar and pestle to obtain a fine powder, and calcined to 800° C. for 2 hours in air. The sample was pelletized, crushed, and screened to 30–50 mesh prior to SHC testing.

1.0 grams of steamed OlefinsMax (prepared as described in Example 1) was physically mixed with 0.5 grams of SHC catalyst and 2.0 gram of SiC, and loaded into a fixed bed reactor. All other testing conditions were kept the same as in Example 1. Table 4 shows the results of the SHC test.

TABLE 4

| | SHC Catalyst | | |
|---|---|---|---|
| | $In_{0.8}Ca_{0.2}MnO_3$ | $Bi_{0.4}Ca_{0.6}Mn_{0.6}Ni_{0.4}O_3$ | $Ca_{0.6}Na_{0.4}SnO_3$ |
| % Conversion | 20.9 | 8.1 | 7.9 |
| $C_1$–$C_4$ Yield (wt %) | 16.2 | 6.7 | 6.7 |
| $H_2$ Yield (wt %) | 0.011 | 0.0076 | 0.034 |
| % $H_2$ Conversion | 92 | 83 | 22 |
| $CO_x$ Yield (wt %) | 0.220 | 0.129 | 0 |
| % $H_2$ Selectivity | 85 | 80 | 100 |

Example 8

Table 5 shows the performance of additional combinations of sub-group 2 SHC catalysts with the cracking catalyst of Example 1. All tests were run at the conditions described in Example 1 with 0.5 grams of the SHC catalyst being tested mixed with 2.0 grams of SiC and either 1.0 grams of steamed OlefinsMax or 0.5 grams of fresh OlefinsMax.

TABLE 5

| Catalyst Composition | % $H_2$ Conversion | % $H_2$ Selectivity |
|---|---|---|
| $La_{0.2}Ca_{0.8}Mn_{0.54}Co_{0.36}Ti_{0.1}O_3$ | 91.7 | ~100 |
| $La_{0.2}Ca_{0.8}Mn_{0.54}Co_{0.36}Sn_{0.1}O_3$ | 90.8 | ~100 |
| $La_{0.2}Ca_{0.8}Mn_{0.4}Co_{0.4}Ti_{0.2}O_3$ | 90.4 | ~100 |
| $La_{0.6}Ca_{0.4}CoO_3$ | 89.6 | 97 |
| $La_{0.2}Ca_{0.8}Mn_{0.6}Co_{0.4}O_3$ | 89.0 | 97 |
| $La_{0.2}Ca_{0.8}Mn_{0.8}Ni_{0.2}O_3$ | 85.1 | 97 |
| $La_{0.2}Ca_{0.8}Mn_{0.4}Co_{0.4}Sn_{0.2}O_3$ | 83.1 | ~100 |
| $La_{0.2}Ca_{0.8}Mn_{0.4}Co_{0.4}Al_{0.2}O_3$ | 82.3 | 99 |
| $La_{0.2}Ca_{0.8}Mn_{0.4}Co_{0.4}Al_{0.2}O_3$ | 76.0 | 100 |
| $La_{0.2}Ca_{0.8}Mn_{0.4}Co_{0.4}Al_{0.2}O_3$ | 72.0 | 97 |
| $La_{0.2}Ca_{0.8}Mn_{0.54}Co_{0.36}Al_{0.1}O_3$ | 81.4 | ~100 |
| $La_{0.2}Ca_{0.8}Mn_{0.8}Co_{0.2}O_3$ | 81.2 | 100 |
| $Ba_{0.8}K_{0.2}Bi_{0.8}La_{0.2}O_3$ | 79.3 | 98 |
| $La_{0.2}Ca_{0.8}Mn_{0.4}Ti_{0.4}Al_{0.2}O_3$ | 77.4 | ~100 |
| $La_{0.6}Ca_{0.4}Co_{0.6}Ni_{0.2}Al_{0.2}O_3$ | 77.1 | ~100 |
| $La_{0.6}Ca_{0.4}Co_{0.8}Ti_{0.2}O_3$ | 76.8 | 99 |
| $BaBi_{0.5}La_{0.5}O_3$ | 75.4 | 99 |
| $La_{0.2}Ca_{0.8}Mn_{0.2}Co_{0.6}Al_{0.2}O_3$ | 72.7 | ~100 |
| $La_{0.6}Ca_{0.4}Co_{0.8}Al_{0.2}O_3$ | 72.2 | 100 |
| $La_{0.6}Ca_{0.4}Co_{0.9}Al_{0.1}O_3$ | 71.6 | 100 |
| $La_{0.6}Ca_{0.4}MnO_3$ | 68.8 | 95 |
| $La_{0.2}Ca_{0.8}MnO_3$ | 66.9 | 96 |
| $La_{0.4}Ca_{0.6}Mn_{0.4}Co_{0.4}Al_{0.2}O_3$ | 66.4 | N/A |
| $La_{0.2}Ca_{0.8}Mn_{0.6}Co_{0.2}Al_{0.2}O_3$ | 65.2 | 97 |
| $La_{0.6}Ca_{0.4}Co_{0.6}Mn_{0.4}O_3$ | 64.9 | 85 |
| $La_{0.6}Ca_{0.4}Co_{0.6}Al_{0.4}O_3$ | 63.8 | 100 |
| $BaBi_{0.6}La_{0.4}O_3$ | 62.3 | 99 |
| $La_{0.2}Ca_{0.8}Mn_{0.8}Mg_{0.2}O_3$ | 60.0 | 86 |
| $La_{0.6}Ca_{0.4}Mn_{0.5}Fe_{0.5}O_3$ | 58.5 | ~100 |
| $La_{0.6}Sr_{0.4}Co_{0.8}Al_{0.2}O_3$ | 57.8 | 100 |
| $BaBi_{0.6}Yb_{0.4}O_3$ | 56.7 | 90 |
| $BaBi_{0.67}Sn_{0.16}La_{0.2}O_3$ | 55.9 | 99 |
| $La_{0.8}Ca_{0.2}Mn_{0.8}Ga_{0.2}O_3$ | 55.5 | 100 |
| $La_{0.8}Ca_{0.2}Mn_{0.8}Al_{0.2}O_3$ | 55.4 | 98 |
| $La_{0.2}Ca_{0.8}Mn_{0.4}Sn_{0.4}Al_{0.2}O_3$ | 53.8 | ~100 |
| $La_{0.6}Ca_{0.4}Mn_{0.8}Ni_{0.2}O_3$ | 51.0 | 64 |
| $La_{0.6}Ca_{0.4}Mn_{0.8}Co_{0.2}O_3$ | 50.8 | 62 |
| $La_{0.6}Ca_{0.4}Mn_{0.8}Cu_{0.2}O_3$ | 50.7 | 88 |
| $La_{0.2}Ca_{0.8}Mn_{0.54}Co_{0.36}Ga_{0.1}O_3$ | 49.8 | 86 |
| $La_{0.6}Ca_{0.4}Mn_{0.8}Al_{0.2}O_3$ | 49.3 | 100 |
| $La_{0.4}Ca_{0.6}Co_{0.8}Al_{0.2}O_3$ | 48.4 | 100 |
| $BaBi_{0.4}Sn_{0.4}La_{0.2}O_3$ | 48.2 | 100 |
| $La_{0.8}Ca_{0.2}Co_{0.8}Al_{0.2}O_3$ | 48.1 | 100 |
| $La_{0.6}Ca_{0.4}Fe_{0.2}Co_{0.8}O_3$ | 46.5 | 93 |
| $BaBi_{0.8}La_{0.2}O_3$ | 45.0 | 94 |
| $La_{0.2}Ca_{0.8}Mn_{0.5}Co_{0.2}Ni_{0.2}Al_{0.1}O_3$ | 29.5 | 36 |
| $Y_{0.6}Ca_{0.4}MnO_3$ | 21.6 | 29 |
| $La_{0.6}Ca_{0.4}Fe_{0.8}Co_{0.2}O_3$ | 20.6 | 60 |
| $Sr_{0.8}Na_{0.2}Sn_{0.8}Y_{0.2}O_3$ | 19.6 | 100 |

Examples Comprising Metals from Sub-Group 3

Example 9

This example illustrates the preparation and performance of selective hydrogen combustion (SHC) catalyst for reducing the hydrogen yield in the product, while minimizing non-selective hydrocarbon oxidation. $Ba_{0.8}K_{0.2}Bi_{0.8}La_{0.2}O_3$ catalyst was prepared by co-precipitation of metal salts using an organic base in an alcohol medium. Solution A was prepared by adding 12 mL of concentrated nitric acid to 50 mL of deionized water. 8.069 grams of bismuth nitrate pentahydrate (Aldrich Chemical Company, Milwaukee, Wis.) were added to this solution and stirred for 10 minutes to allow complete dissolution. 4.348 grams of barium nitrate (Alfa Aesar, Ward Hill, Mass.), 1.801 grams of lanthanum nitrate hexahydrate (Aldrich Chemical Company, Milwaukee, Wis.) and 200 grams of water were then added and dissolved in solution A. Solution B was prepared by dissolving 101 grams of tetraethylammonium hydroxide, 35 wt % solution (Alfa Aesar, Ward Hill, Mass.) in 750 grams of isopropanol (VWR Scientific Products Corporation, Chicago, Ill.). Solution A was slowly poured into a well-stirred solution B, resulting in precipitate formation. After aging the suspension for 1 hour, the particles were recovered by centrifugation at 1500–2000 rpm. The precipitate was then resuspended in 250 mL of isopropanol followed by centrifugation to remove water and impurity cations/anions. This washing step was repeated. 0.06248 g of potassium per gram of solution was prepared by dissolving KOH (Mallinckrodt Baker Inc., Paris, Ky.) in deionized water. 3.729 grams of KOH solution and 100 mL of isopropanol were added to the precipitate, and stirred to obtain a homogenous suspension. The suspension was heated to 90° C. to evaporate the isopropanol, ground using a mortar and pestle to obtain a fine powder, and calcined at 800° C. for 2 hours in air. The sample was pelletized, crushed, and screened to 30–50 mesh prior to SHC testing.

1.0 gram of steamed OlefinsMax (prepared as described in Example 1) was physically mixed with 0.5 gram of SHC catalyst and 2.0 gram of SiC, and loaded into a fixed bed reactor. All other testing conditions were kept the same as in Example 1. Table 6 shows the results of the SHC test.

The data in Table 6 demonstrates that significant reductions in hydrogen yield can be achieved through the addition of the SHC catalyst. Compared to Example 1, there is a 79 percent reduction in hydrogen yield at similar hydrocarbon conversion and $C_1$–$C_4$ yields. Moreover, the SHC catalyst exhibits a very high selectivity of 99 percent for hydrogen combustion, resulting in essentially no $CO_x$ formation through non-selective hydrocarbon activation.

Example 10

This example illustrates the preparation and performance of selective hydrogen combustion (SHC) catalyst for reducing the hydrogen yield in the product, while minimizing non-selective hydrocarbon oxidation. $La_{0.6}Ca_{0.4}MnO_3$ catalyst was prepared by co-precipitation of metal salts using an organic base in an alcohol medium. Solution A was prepared by dissolving 9.631 grams of lanthanum nitrate hexahydrate (Aldrich Chemical Company, Milwaukee, Wis.), 3.502 grams of calcium nitrate tetrahydrate (Alfa Aesar, Ward Hill, Mass.), and 10.552 grams of manganese (II) nitrate hydrate (Aldrich Chemical Company, Milwaukee, Wis.) in 185 grams of deionized water. Solution B was prepared by dissolving 108 grams of tetraethylammonium hydroxide, 35 wt % solution (Alfa Aesar, Ward Hill, Mass.) in 418 grams of isopropanol (VWR Scientific Products Corporation, Chicago, Ill.). Solution A was slowly poured into a well-stirred solution B, resulting in precipitate formation. After aging the suspension for 1 hour, the particles were recovered by centrifugation at 1500–2000 rpm. The precipitate was then resuspended in 250 mL of isopropanol followed by centrifugation to remove water and impurity cations/anions. This washing step was repeated. The precipitate was dried in air at 25° C., ground to a fine powder using a mortar and pestle, and calcined to 750° C. for 2 hours in air. The sample was pelletized, crushed, and screened to 30–50 mesh prior to SHC testing.

1.0 gram of steamed OlefinsMax (prepared as described in Example 1) was physically mixed with 0.5 gram of SHC catalyst and 2.0 gram of SiC, and loaded into a fixed bed reactor. All other testing conditions were kept the same as in Example 1. Table 6 shows the results of the SHC test.

The data in Table 6 demonstrate that significant reductions in hydrogen yield can be achieved through the addition of SHC catalyst. Compared to Example 1, there is a 72 percent reduction in hydrogen yield at similar hydrocarbon conversion and $C_1$–$C_4$ yields. Moreover, the SHC catalyst exhibits a very high selectivity of 94 percent for hydrogen combustion, resulting in essentially no $CO_x$ formation through non-selective hydrocarbon activation.

Example 11

This example illustrates the preparation and performance of selective hydrogen combustion (SHC) catalyst for reducing the hydrogen yield in the product, while minimizing non-selective hydrocarbon oxidation. $La_{0.6}Ca_{0.4}Fe_{0.2}Co_{0.8}O_3$ catalyst was prepared by co-precipitation of metal salts using an organic base in an alcohol medium. Solution A was prepared by dissolving 9.473 grams of lanthanum nitrate hexahydrate (Aldrich Chemical Company, Milwaukee, Wis.), 3.444 grams of calcium nitrate tetrahydrate (Alfa Aesar, Ward Hill, Mass.), 2.946 grams of iron (III) nitrate nonahydrate (Aldrich Chemical Company, Milwaukee, Wis.), and 8.490 grams of cobalt nitrate hexahydrate (Alfa Aesar, Ward Hill, Mass.) in 182 grams of deionized water. Solution B was prepared by dissolving 110 grams of tetraethylammonium hydroxide, 35 wt % solution (Alfa Aesar, Ward Hill, Mass.) in 429 grams of isopropanol (VWR Scientific Products Corporation, Chicago, Ill.). Solution A was slowed poured into a well-stirred solution B, resulting in precipitate formation. After aging the suspension for 1 hour, the particles were recovered by centrifugation at 1500–2000 rpm. The precipitate was then resuspended in 250 mL of isopropanol followed by centrifugation to remove water and impurity cations/anions. This washing step was repeated. The precipitate was dried in air at 25° C., ground to a fine powder using a mortar and pestle, and calcined to 750° C. for 2 hours in air. The sample was pelletized, crushed, and screened to 30–50 mesh prior to SHC testing.

1.0 gram of steamed OlefinsMax (prepared as described in Example 1) was physically mixed with 0.5 gram of SHC catalyst and 2.0 gram of SiC, and loaded into a fixed bed reactor. All other testing conditions were kept the same as in Example 1. Table 6 shows the results of the SHC test.

TABLE 6

| | SHC Catalyst | | |
|---|---|---|---|
| | $Ba_{0.8}K_{0.2}Bi_{0.8}La_{0.2}O_3$ | $La_{0.6}Ca_{0.4}MnO_3$ | $La_{0.6}Ca_{0.4}Fe_{0.2}Co_{0.8}O_3$ |
| % Conversion | 39.2 | 22.1 | 19.8 |
| $C_1$–$C_4$ Yield (wt %) | 33.3 | 18.6 | 17.3 |
| $H_2$ Yield (wt %) | 0.049 | 0.037 | 0.048 |
| % $H_2$ Conversion | 79 | 72 | 63 |
| $CO_x$ Yield (wt %) | 0.028 | 0.070 | 0.016 |
| % $H_2$ Selectivity | 99 | 94 | 98 |

The data in Table 6 demonstrate that significant reductions in hydrogen yield can be achieved through the addition of the SHC catalyst. Compared to Example 1, there is a 63 percent reduction in hydrogen yield at similar hydrocarbon conversion and $C_1$–$C_4$ yields. Moreover, the SHC catalyst exhibits a very high selectivity of 98 percent for hydrogen combustion, resulting in essentially no $CO_x$ formation through non-selective hydrocarbon activation.

Example 12

Table 7 shows the performance of additional combinations of sub-group 3 SHC catalysts with the cracking catalyst of Example 1. All tests were run at the conditions described in Example 1 with 0.5 grams of the SHC catalyst being tested mixed with 2.0 grams of SiC and either 1.0 grams of steamed OlefinsMax or 0.5 grams of fresh OlefinsMax.

TABLE 7

| Catalyst Composition | % $H_2$ Conversion | % $H_2$ Selectivity |
|---|---|---|
| $Ba_{0.25}MnO_x$ ($K_2CO_3$ syn, High pH) | 93.1 | ~100 |
| $Mg_{0.125}MnO_x$ ($K_2CO_3$ syn.) | 91.7 | ~100 |
| $Mg_{0.25}MnO_x$ ($K_2CO_3$ syn.) 700 C, repeat | 91.7 | ~100 |
| $Mg_{0.25}MnO_x$ ($K_2CO_3$ syn.) 700 C, steamed 18 h | 91.3 | 99 |
| $Mg_{0.25}MnO_x$ ($NaHCO_3$)-800 C-BCSU-2 | 91.3 | 95 |
| $Ba_{0.125}MnO_x$ ($K_2CO_3$ syn., High pH) | 90.8 | 99 |
| $Ba_{0.25}MnO_x$ ($K_2CO_3$ syn, High pH) steamed 18 h | 90.6 | ~100 |
| $Ba_{0.25}MnO_x$ ($K_2CO_3$ syn) | 89.3 | ~100 |
| $Ba_{0.125}MnO_x$ (0.75 × $K_2CO_3$ syn.) | 89.1 | ~100 |

TABLE 7-continued

| Catalyst Composition | % H$_2$ Conversion | % H$_2$ Selectivity |
|---|---|---|
| Mn$_{0.7}$Mg$_{0.3}$O$_x$ | 89.1 | 97 |
| Sr$_{0.25}$MnO$_x$ (K$_2$CO$_3$) | 89.1 | ~100 |
| In$_{0.8}$Ca$_{0.2}$MnO$_3$ | 88.9 | 87 |
| Ba$_{0.25}$K$_{0.2}$MnO$_x$ (hydroxide syn.) | 87.5 | 97 |
| Mg$_{0.25}$MnO$_x$ (K$_2$CO$_3$ syn.) 700 C | 86.6 | 92 |
| Bi$_{0.2}$Ca$_{0.8}$Mn$_{0.8}$Co$_{0.2}$O$_3$ | 85.9 | N/A |
| Mn$_{0.6}$Mg$_{0.4}$O$_x$ | 85.7 | 19 |
| Mg$_{0.25}$MnO$_x$ (K$_2$CO$_3$ syn.) (High pH) | 85.6 | ~100 |
| Bi$_{0.2}$Ca$_{0.8}$Mn$_{0.8}$Ni$_{0.2}$O$_3$ | 85.4 | 81 |
| Bi$_{0.4}$Ca$_{0.6}$Mn$_{0.6}$Ni$_{0.4}$O$_3$ | 84.6 | 72 |
| Ba$_{0.125}$MnO$_x$ (K$_2$CO$_3$ syn.) | 80.6 | ~100 |
| Mg$_{0.25}$MnO$_x$ (K-syn) | 80.5 | 89 |
| Mg$_{0.25}$MnO$_x$ (1.25 × K$_2$CO$_3$ syn.) | 80.0 | 48 |
| Mg$_{0.25}$MnO$_x$ (0.75 × K$_2$CO$_3$ syn.) | 79.6 | 29 |
| Mg$_{0.25}$MnO$_x$ (NaHCO$_3$)-BCSU-2 | 78.6 | 89 |
| CaMn$_{0.4}$Sn$_{0.4}$Co$_{0.2}$O$_3$ | 77.6 | 86 |
| In$_{0.8}$Mg$_{0.2}$Mn$_{0.6}$Al$_{0.4}$O$_3$ | 77.5 | 86 |
| In$_{0.8}$Zn$_{0.2}$Mn$_{0.6}$Al$_{0.4}$O$_3$ | 77.5 | 86 |
| Ba$_{0.25}$MnO$_x$ (Na$_2$CO$_3$ syn) | 77.3 | ~100 |
| Ba$_{0.25}$MnO$_x$ (NaHCO$_3$ syn.) | 76.3 | 94 |
| Mg$_{0.5}$MnO$_x$ (Na$_2$CO$_3$ syn) | 75.6 | 90 |
| CoMn$_2$O$_4$ (15% Na) | 71.6 | 86 |
| Mg$_{0.25}$MnO$_x$ (K$_2$CO$_3$ syn.) 800 C | 71.4 | 93 |
| Mg$_{0.5}$MnO$_x$ (K$_2$CO$_3$ syn) | 71.1 | ~100 |
| Mg$_{0.25}$MnO$_x$ (Na$_2$CO$_3$ syn.) | 70.6 | 90 |
| CaMn$_{0.8}$Sb$_{0.2}$O$_3$ | 69.5 | ~100 |
| CaMn$_{0.4}$Co$_{0.4}$Al$_{0.2}$O$_3$ | 69.4 | ~100 |
| Ba$_{0.25}$MnO$_x$ (K$_2$CO$_3$ syn, High pH) steamed 72 h | 67.8 | 97 |
| SrSb$_{0.4}$Sn$_{0.3}$Mg$_{0.3}$O$_x$ | 67.3 | 83 |
| CoMn$_2$O$_4$ (15% K) | 66.0 | 58 |
| Mn$_{0.9}$Mg$_{0.1}$O$_2$ | 65.3 | 45 |
| Mg$_{0.125}$MnO$_x$ (Na$_2$CO$_3$) | 60.1 | 95 |
| Ba$_{0.25}$K$_{0.1}$MnO$_x$ (hydroxide syn.) | 58.9 | 98 |
| Ni$_{0.8}$Mg$_{0.2}$MnO$_3$ | 56.9 | 21 |
| Mn$_{0.7}$Mg$_{0.2}$Al$_{0.1}$O$_x$ | 56.4 | 96 |
| Mn$_{0.7}$Mg$_{0.2}$Ti$_{0.1}$O$_x$ | 52.5 | 95 |
| SrSb$_{0.5}$Ca$_{0.5}$O$_x$ | 52.5 | ~100 |
| SrTi$_{0.4}$Sn$_{0.4}$Al$_{0.2}$O$_3$ | 52.1 | ~100 |
| SrMn$_{0.4}$Ti$_{0.4}$Al$_{0.2}$O$_3$ | 50.4 | ~100 |
| Ca$_2$Mn$_3$O$_8$ | 50.3 | 70 |
| Mg$_{0.25}$MnO$_x$ (Na$_2$CO$_3$) (High pH) | 47.6 | 59 |
| Ca$_{0.25}$MnO$_x$ (hydroxide syn.) | 47.4 | 42 |
| CaZr$_{0.8}$Al$_{0.2}$O$_3$ | 46.9 | ~100 |
| Bi$_{0.4}$Ca$_{0.6}$MnO$_3$ | 46.6 | 30 |
| Bi$_{0.4}$Sr$_{0.6}$Co$_{0.2}$Fe$_{0.8}$O$_3$ | 46.4 | 57 |
| Ba$_{0.5}$MnO$_x$ (hydroxide syn.) | 41.5 | 99 |
| CaMn$_{0.8}$Al$_{0.2}$O$_3$ | 34.9 | 50 |
| Ca$_{0.8}$Na$_{0.2}$SnO$_3$ | 23.0 | N/A |
| Ca$_{0.6}$Na$_{0.4}$SnO$_3$ | 21.7 | N/A |
| BaZrO$_3$ | 17.5 | N/A |

Examples Comprising Metals from Sub-Group 4

Example 13

This example illustrates the preparation and performance of selective hydrogen combustion (SHC) catalyst for reducing the hydrogen yield in the product, while minimizing non-selective hydrocarbon oxidation. In$_{0.9}$Zn$_{0.1}$MnO$_3$ catalyst was prepared by co-precipitation of metal salts using an organic base and a carbonate precursor. Solution A was prepared by dissolving 6.742 grams of indium (III) nitrate hydrate (Alfa Aesar, Ward Hill, Mass.), 0.516 grams of zinc acetate dihydrate (Aldrich Chemical Company, Milwaukee, Wis.) and 6.688 grams of manganese (II) nitrate hydrate (Aldrich Chemical Company, Milwaukee, Wis.) in 117 grams of deionized water. Solution B was prepared by dissolving 14.6 sodium bicarbonate (Mallinckrodt Baker Inc., Paris, Ky.), 43.7 grams of tetraethylammonium hydroxide, 35 wt % solution (Alfa Aesar, Ward Hill, Mass.) in 693 grams of deionized water. Solution A was slowed poured into a well-stirred solution B, resulting in precipitate formation. After aging the suspension for 1 hour, the particles were recovered by centrifugation at 1500–2000 rpm. The precipitate was then resuspended in 250 mL of ethanol (Alfa Aesar, Ward Hill, Mass.) followed by centrifugation to remove water, impurity cations/anions. The precipitate was dried in air at 25° C., ground to a fine powder using a mortar and pestle, and calcined to 800° C. for 2 hours in air. The sample was pelletized, crushed, and screened to 30–50 mesh prior to SHC testing.

The 1.0 grams of steamed OlefinsMax (prepared as described in Example 1) was physically mixed with 0.5 grams of SHC catalyst and 2.0 gram of SiC, and loaded into a fixed bed reactor. All other testing conditions were kept the same as in Example 1. Table 8 shows the results of the SHC test.

The data in Table 8 demonstrate that significant reductions in hydrogen yield can be achieved through the addition of SHC catalyst. Compared to Example 1, there is a 78 percent reduction in hydrogen yield at similar hydrocarbon conversion and C1–C4 yields. Moreover, the SHC catalyst exhibits a very high selectivity of 97 percent for hydrogen combustion, resulting in virtually no CO$_x$ formation through non-selective hydrocarbon activation.

Example 14

This example illustrates the preparation and performance of selective hydrogen combustion (SHC) catalyst for reducing the hydrogen yield in the product, while minimizing non-selective hydrocarbon oxidation. In$_{0.95}$Cu$_{0.05}$MnO$_3$ catalyst was prepared by co-precipitation of metal salts using an organic base and a carbonate precursor. Solution A was prepared by dissolving 7.038 grams of indium nitrate hydrate (Alfa Aesar, Ward Hill, Mass.), 0.281 grams of copper (II) nitrate hydrate (Alfa Aesar, Ward Hill, Mass.), and 6.614 grams of manganese (II) nitrate hydrate (Aldrich Chemical Company, Milwaukee, Wis.) in 116 grams of deionized water. Solution B was prepared by dissolving 14.5 grams of sodium bicarbonate (Mallinckrodt Baker Inc., Paris, Ky.), 43.6 grams of tetraethylammonium hydroxide, 35 wt % solution (Alfa Aesar, Ward Hill, Mass.) in 691 grams of deionized water. Solution A was slowed poured into a well-stirred solution B, resulting in precipitate formation. After aging the suspension for 1 hour, the particles were recovered by centrifugation at 1500–2000 rpm. The precipitate was then resuspended in 250 mL of ethanol (Alfa Aesar, Ward Hill, Mass.) followed by centrifugation to remove water, impurity cations/anions. This washing step was repeated. The precipitate was dried in air at 25° C., ground to a fine powder using a mortar and pestle, and calcined to 800° C. for 2 hours in air. The sample was pelletized, crushed, and screened to 30–50 mesh prior to SHC testing.

1.0 grams of steamed OlefinsMax (prepared as described in Example 1) was physically mixed with 0.5 grams of SHC catalyst and 2.0 gram of SiC, and loaded into a fixed bed reactor. All other testing conditions were kept the same as in Example 1. Table 8 shows the results of the SHC test.

TABLE 8

| | SHC Catalyst | |
|---|---|---|
| | In$_{0.9}$Zn$_{0.1}$MnO$_3$ | In$_{0.95}$Cu$_{0.05}$MnO$_3$ |
| % Conversion | 8.9 | 8.1 |
| C$_1$–C$_4$ Yield (wt %) | 7.1 | 6.1 |
| H$_2$ Yield (wt %) | 0.010 | 0.0038 |

TABLE 8-continued

| | SHC Catalyst | |
|---|---|---|
| | $In_{0.9}Zn_{0.1}MnO_3$ | $In_{0.95}Cu_{0.05}MnO_3$ |
| % $H_2$ Conversion | 78 | 91 |
| $CO_x$ Yield (wt %) | 0.012 | 0.158 |
| % $H_2$ Selectivity | 97 | 71 |

The data in Table 8 demonstrate that significant reductions in hydrogen yield can be achieved through the addition of SHC catalyst. Compared to Example 1, there is a 91 percent reduction in hydrogen yield at similar hydrocarbon conversion and C1–C4 yields. Moreover, the SHC catalyst exhibits a high selectivity of 71 percent for hydrogen combustion, resulting in minimal $CO_x$ formation through non-selective hydrocarbon activation.

Example 15

Table 9 shows the performance of additional combinations of sub-group 3 SHC catalysts with the cracking catalyst of Example 1. All tests were run at the conditions described in Example 1 with 0.5 grams of the SHC catalyst being tested mixed with 2.0 grams of SiC and either 1.0 grams of steamed OlefinsMax or 0.5 grams of fresh OlefinsMax.

TABLE 9

| Catalyst Composition | % $H_2$ Conversion | % $H_2$ Selectivity |
|---|---|---|
| $In_{0.975}Cu_{0.025}MnO_3$ | 93.1 | 64 |
| $Mn_{0.8}Co_{0.2}O_2$ | 86.1 | 56 |
| $In_{0.9}Zn_{0.1}Mn_{0.8}Al_{0.2}O_3$ | 85.8 | 84 |
| $Mn_{0.7}Zn_{0.3}O_2$ | 85.7 | 37 |
| $In_{0.9}Zn_{0.1}MnO_3$ | 84.9 | 90 |
| $Mn_{0.9}Zn_{0.1}O_2$ | 84.1 | 78 |
| $Mn_{0.8}Zn_{0.2}O_2$ | 81.6 | 93 |
| $Mn_{0.72}Zn_{0.18}Al_{0.1}O_2$ | 80.9 | 94 |
| $InMnO_3$ | 80.4 | 93 |
| $Mn_{0.8}Zn_{0.1}Al_{0.1}O_2$ | 77.6 | 100 |
| $In_{0.67}Mn_{0.67}Al_{0.67}O_3$ | 75.3 | 68 |
| $In_{0.95}Cu_{0.05}MnO_3$ | 72.6 | 64 |
| $In_{0.8}Cu_{0.2}MnO_3$ | 72.3 | 60 |
| $Mn_{0.72}Zn_{0.18}Ti_{0.1}O_2$ | 68.1 | 92 |

Example 16

This example illustrates the hydrogen yield during hydrocarbon cracking using a metal-based selective hydrogen combustion material with significant sulfur content. Sulfur was added to the metal-based component during reduction-oxidation cycles due to the presence of 0.99 wt % sulfur in the gas oil feed. The catalyst mixture consisted of 8.1 grams of equilibrated FCC catalyst (Beaumont ADA catalyst), 0.9 grams of OlefinsMax (Grace Davison Division of W.R. Grace & Co.) which had been steamed at 1500° F. (816° C.) for 16 hours, and 0.9 grams of $Mg_{0.25}Na_2MnO_x$ material (60–100 mesh powder), the metal-based component. Each cycle consisted of hydrocarbon cracking by the FCC and OlefinsMax catalysts and hydrogen oxidation by the metal-based component, followed by air regeneration to remove coke deposited from the catalyst surface and re-oxidation of the metal-based component. During both cracking and regeneration, the catalyst particles were kept in a fluidized state by nitrogen co-feed. Vacuum gas oil (Baton Rouge Hot Cat) was used as hydrocarbon feed, and was injected at 1.2 g/min for 75 sec through the fluidized catalyst bed at 1035° F. (557° C.) resulting in an overall catalyst-to-oil ratio of approximately 6. The product gas was cooled, and liquid and vapor fractions were separated and analyzed via gas chromatography. The coked catalyst system was regenerated by addition of air at 1250° F. (677° C.). After regeneration was complete, the cracking and regeneration cycle was repeated. After 4 cycles, the catalyst mixture was removed from the reactor, the metal-based component was separated from the zeolite using a 100 mesh sieve, and the amount of sulfur added to the metal-based component was analyzed by X-ray Fluorescence (XRF). It was found that the metal-based component contained 4.3 wt. % sulfur, and testing for selective hydrogen combustion indicated conversion was 70% and selectivity for H2 was 69%.

Example 16 shows that at least some of the crystal structures will incorporate sulfur through exposure to sulfur in the feedstock. It further demonstrates that crystal structures incorporating sulfur remain effective for selective hydrogen combustion.

Example 17

This example illustrates the use of selective hydrogen combustion for the production increase of propylene and butylene in a typical FCC unit. The study was done using computer yield simulation. The base case simulates a cracking catalyst composed of 97 wt % FCC base catalyst and 3% ZSM-5 additive catalyst, which is a fairly common catalyst blend for FCC units. The volumetric yields of the cracked products are listed in Table 15. The base case is compared to a selective-hydrogen-combustion case, in which the ZSM-5 additive was raised to 7.6 wt % in addition to presence of 5 wt % selective hydrogen combustion catalyst. The product yields are also listed in Table 10. It is seen that the selective hydrogen combustion catalyst can reduce the hydrogen concentration in the product stream to near zero. This reduction frees vapor handling capacity downstream of the quench and initial vapor liquid separation, which can then be used for additional light olefins. Light olefin production is limited by vapor handling capacity and can readily be increased by use of additional olefin selective cracking catalyst, such as ZSM-5. As a result, it is possible to increase propylene and butylene production from 421.3 to 503.8 kg.mole/hr and from 462.7 to 524.0 kg.mole/hr, respectively. As the results indicate, the production increase is accomplished at a constant total volume of light gases, essentially overcoming the compressor and/or fractionator volumetric limitations without any investments in the equipment.

TABLE 10

| Products | Base Case (97% Base Catalyst + 3% ZSM-5 Additive) Yields, kg · mole/hr | Selective Hydrogen Combustion Case (87.4% Base Catalyst + 7.6% ZSM-5 Additive + 5% SHC Additive) Yields, kg · mole/hr | Yields Δ, kg· mole/hr |
|---|---|---|---|
| H2 | 143.8 | 0 | −143.8 |
| CH4 | 193.6 | 193.6 | |
| C2 | 180.7 | 190.7 | |
| C3 | 421.3 | 503.8 | +82.5 |
| C4 | 462.7 | 524.0 | +61.3 |
| | | | Σ C4-volume Δ = 0 |
| Naphtha | 948.2 | 883.1 | −65.1 |

TABLE 10-continued

| | Base Case (97% Base Catalyst + 3% ZSM-5 Additive) | Selective Hydrogen Combustion Case (87.4% Base Catalyst + 7.6% ZSM-5 Additive + 5% SHC Additive) | |
|---|---|---|---|
| Products | Yields, kg · mole/hr | Yields, kg · mole/hr | Yields Δ, kg· mole/hr |
| Heavy | 258.4 | 258.4 | |
| H2O | 245.8 | 389.6 | +143.8 |

In this process of converting hydrogen to water, the mixed metal oxide gets reduced or becomes oxygen-deficient due to the utilization of its lattice oxygen needed to oxidize hydrogen. During catalyst regeneration, the reduced mixed metal oxide is oxidized by $NO_x$ and in the process converts $NO_x$ to $N_2$. This approach is different from conventional de-$NO_x$ additives to FCC, which do not perform hydrogen combustion (hence, do not undergo bulk reduction) in the riser. After the mixed metal oxide is re-oxidized to its original state, it is fed back to the riser as described above for repeated reduction by hydrogen.

No modifications to the regeneration process are required for realization of $NO_x$ reduction during catalyst regeneration performed in existing fluid catalytic cracking (FCC) reactors. The combined riser-regenerator arrangement allows the mixed metal oxide to undergo repeated reduction-oxidation cycles, thereby performing both SHC and de-$NO_x$ functions over many cycles.

Example 18

A base case experiment was first conducted to measure the amount of $NO_x$ generated during regeneration of a base FCC cracking catalyst. 1.0 gram of spent (coked) FCC catalyst (obtained from Baton Rouge refinery) was physically mixed with 0.5 gram of OlefinsMax (spent sample from 2-methylpentane testing) and approximately 10 grams of silicon carbide (<120 grit) and the mixture was heated to 700° C. in 150 cc/min of helium. The catalyst was allowed to equilibrate at 700° C. for 1 hour prior to substituting helium by a feed stream consisting of 150 cc/min of 33% air and balance helium. The reactor effluent was analyzed using a chemiluminescence detector (Eco Physics CLD 70S NO analyzer) until the $NO_x$ elution was complete.

The performance of the de-$NO_x$ additive was tested by physically-blending 0.5 gram of spent $La_{0.6}Ca_{0.4}Mn_{0.4}Co_{0.6}O_3$ perovskite SHC catalyst (from 2-methylpentane testing), 0.5 gram of spent OlefinsMax, 1.0 gram of coked FCC catalyst, and approximately 10 grams of silicon carbide. All other testing conditions were kept the same as in the base case. FIG. 1 shows the measured NO concentration in the reactor effluent with reaction time for the spent SHC catalyst (solid line) compared to the base case (dotted line). It is evident that addition of the perovskite catalyst decreases the net NOx generated during regeneration. The net amount of NO generated was reduced by 68% when spent $La_{0.6}Ca_{0.4}Mn_{0.4}Co_{0.6}O_3$ perovskite was added.

Example 19

Other test data showing the effect of the metal-based component on $NO_x$ reduction are contained in Table 11.

TABLE 11

| Catalyst Composition | % $NO_x$ Conversion |
|---|---|
| $In_{0.95}Cu_{0.5}MnO_3$ | 62 |
| $Mn_{0.8}Co_{0.2}O_x$ | 59 |
| $Mn_{0.7}Zn_{0.3}O_x$ | 55 |
| $In_{0.8}Zn_{0.2}MnO_3$ | 39 |
| $In_{0.9}Zn_{0.1}MnO_3$ | 26 |
| $In_{0.975}Cu_{0.025}MnO_3$ | 24 |
| $Mg_{0.25}Na_zMnO_x$ | 73 |
| $LaMn_{0.4}Ni_{0.4}Al_{0.2}O_3$ | 47 |
| $La_{0.2}Co_{0.8}MnO_3$ | 47 |

We claim:

1. A process comprising contacting at least one hydrocarbon feedstream with a cracking/selective hydrogen combustion catalyst system under effective catalytic reaction conditions to produce cracked products and uncracked feed comprising liquid and gaseous hydrocarbons, wherein the yield of hydrogen is less than the yield of hydrogen when contacting said hydrocarbon feedstream(s) with said cracking catalyst alone under said catalytic reaction conditions, said process comprising the steps of:

(a) charging at least one hydrocarbon feedstream to a fluid catalytic cracking reactor;

(b) charging a hot fluidized cracking/selective hydrogen combustion catalyst system from a catalyst regenerator to said fluid catalytic cracking reactor, said catalyst system comprising (a) at least one molecular sieve and (b) at least one metal-based component, said metal-based component consisting essentially of a combination of metals selected from the group consisting of:

i) at least one metal from Group 3 and at least one metal from Groups 4–15 of the Periodic Table of the Elements;

ii) at least one metal from Groups 5–15 of the Periodic Table of the Elements, and at least one metal from at least one of Groups 1, 2, and 4 of the Periodic Table of the Elements;

iii) at least one metal from Groups 1–2, at least one metal from Group 3, and at least one metal from Groups 4–15 of the Periodic Table of the Elements; and iv) two or more metals from Groups 4–15 of the Periodic Table of the Elements;

and at least one of oxygen and sulfur, wherein the at least one of oxygen and sulfur is chemically bound both within and between the metals;

(c) catalytically cracking said feedstream(s) and simultaneously combusting resultant hydrogen in said fluid catalytic cracking reactor at a temperature of from about 300 to about 800° C. and a pressure of from about 0.1 to 10 atmospheres in the presence of said catalyst system to produce a stream comprising cracked products and a spent catalyst system which are discharged from said reactor;

(d) separating a phase rich in said cracked products and uncracked feed from a phase rich in said spent catalyst system;

(e) stripping said spent catalyst system at stripping conditions to produce a stripped catalyst phase;

(f) decoking and oxidizing said stripped catalyst phase in a catalyst regenerator at catalyst regeneration conditions to produce said hot fluidized cracking/selective hydrogen combustion catalyst system, which is recycled to the said reactor; and (g) separating and recovering said cracked products and uncracked feed.

2. The process of claim 1, wherein said metal-based component is a combination of at least one of oxygen and sulfur, at least one metal selected from Group 3, and at least one metal selected from Groups 4–15 of the Periodic Table of the Elements.

3. The process of claim 1, wherein said metal-based component is a combination of at least one of oxygen and sulfur, at least one metal selected from Groups 5–15, and at least one metal selected from Groups 1, 2, and 4 of the Periodic Table of the Elements.

4. The process of claim 1, wherein said metal-based component is a combination of at least one of oxygen and sulfur, at least one metal selected from Groups 1–2, at least one metal selected from Group 3, and at least one metal selected from Groups 4–15 of the Periodic Table of the Elements.

5. The process of claim 1, wherein said metal-based component is a combination of at least one of oxygen and sulfur and at least two metals selected from Groups 4–15 of the Periodic Table of the Elements.

6. The process of claim 1, wherein said molecular sieve component is at least one zeolite.

7. The process of claim 6, wherein said at least one zeolite is selected from Y, beta, ZSM-5, ZSM-22, ZSM-48, and ZSM-57.

8. The process of claim 1, wherein said effective catalytic reaction conditions include a process temperature of from about 300 to about 800° C.

9. The process of claim 1, wherein said effective catalytic reaction conditions include a process pressure of from about 0.1 to 10 atmospheres.

10. The process of claim 1, wherein said effective catalytic reaction conditions include a process temperature of from about 300 to about 800° C. and a process pressure of from about 0.1 to 10 atmospheres.

11. The process of claim 1, wherein said hydrocarbon feedstream comprises at least one material selected from the group consisting of gas oil, steam cracked gas oil and residues, heavy hydrocarbonaceous oils comprising materials boiling above 566° C., heavy and reduced petroleum crude oil, petroleum atmospheric distillation bottom, petroleum vacuum distillation bottom, heating oil, pitch, asphalt, bitumen, tar sand oils, shale oil, liquid products derived from coal liquefaction processes, steam heating oil, jet fuel, diesel, kerosene, gasoline, coker naphtha, steam cracked naphtha, catalytically cracked naphtha, hydrocrackate, reformate, raffinate reformate, Fischer-Tropsch liquids. Fischer-Tropsch gases, natural gasoline. distillate, virgin naphtha, $C_{5+}$ olefins, $C_{5+}$ paraffins, ethane, propane, butanes, butenes and butadiene, olefinic and paraffinic feedstreams.

12. The process of claim 1, wherein said hydrocarbon feedstream comprises at least one material selected from the group consisting of paraffins, olefins, aromatics, and naphthenes.

13. The process or claim 1, wherein step (C) is characterized by anaerobic selective hydrogen combustion.

14. The process of claim 13, wherein said process is further characterized by producing $NO_x$ emissions and wherein said $NO_x$ emissions are reduced below the level of $NO_x$ emissions resulting from regeneration of the fluidized cracking catalyst without the metal-based component.

15. The process of claim 13, said process is further characterized by producing $NO_x$ emissions and wherein said $NO_x$ emissions are reduced below 50% of the level of $NO_x$ emissions resulting from regeneration of the fluidized cracking catalyst without the metal-based component.

16. The process of claim 1, further comprising a step of regenerating said cracking/selective hydrogen combustion catalyst system, wherein said step is characterized by lower $NO_x$ concentrations in the resulting flue gas than with regeneration of the cracking catalyst alone.

17. The process of claim 1, wherein the at least one metal-based component comprises one or more of $Y_aIn_bZn_c$-$Mn_dO_{x\pm\delta}$, $La_aMn_bNi_cAl_dO_{x\pm\delta}$, $La_aMn_bAl_cO_{x\pm\delta}$, $Sc_aCu_bMn_cO_{x\pm\delta}$, $Sc_aZn_bMn_cO_{x\pm\delta}$, $La_aZr_bO_{x\pm\delta}$, $Mn_aSc_bO_{x\pm\delta}$, and $Pr_aIn_bZn_cO_{x\pm\delta}$, with the proviso that positions held by oxygen may optionally be substituted by sulfur; where a, b, c, and d are each between 0 and 1, the sum of a through d equals 1 to 3, x is the sum of a through d plus 1, and δ is the vacancy concentration or excess oxygen/sulfur concentration.

18. The process of claim 1, wherein the at least one metal-based component comprises one or more of $K_aBa_b$-$Mn_cO_{x\pm\delta}$, $K_aMg_bMn_cO_{x\pm\delta}$, $Na_aMg_bMn_cO_{x\pm\delta}$, $Mn_aMg_bO_{x\pm\delta}$, $K_aSr_bMn_cO_{x\pm\delta}$, $In_aCa_bMn_cO_{x\pm\delta}$, $Bi_aCa_bMn_cCo_dO_{x\pm\delta}$, $Bi_aCa_bMn_cNi_dO_{x\pm\delta}$, $Ca_aMn_bSn_cCo_dO_{x\pm\delta}$, $In_aMg_bMn_cAl_dO_{x\pm\delta}$, $In_aZn_bMn_cAl_dO_{x\pm\delta}$, $Na_aBa_bMn_cO_{x\pm\delta}$, $Na_aCo_bMn_cO_{x\pm\delta}$, $Ca_aMn_bSb_cO_{x\pm\delta}$, $Ca_aMn_bCo_cAl_dO_{x\pm\delta}$, $Sr_aSb_bSn_cMg_dO_{x\pm\delta}$, $K_aCo_bMn_cO_{x\pm\delta}$, $Mn_aMg_bO_{x\pm\delta}$, $Ni_aMg_bMn_cO_{x\pm\delta}$, $Mn_aMg_bAl_cO_{x\pm\delta}$, $Mn_aMg_bTi_cO_{x\pm\delta}$, $Sr_aSb_bCa_cO_{x\pm\delta}$, $Sr_aTi_b$-$Sn_cAl_dO_{x\pm\delta}$, $Sr_aMn_bTi_cAl_dO_{x\pm\delta}$, $Ca_aMn_bO_{x\pm\delta}$, $Ca_aMn_bO_{x\pm\delta}$, $Ca_aZr_bAl_cO_{x\pm\delta}$, $Bi_aCa_bMn_cO_{x\pm\delta}$, $Bi_aSr_bCo_cFe_dO_{x\pm\delta}$, $Ba_aMn_bO_{x\pm\delta}$, $Ca_aMn_bAl_cO_{x\pm\delta}$, $Ca_aNa_bSn_cO_{x\pm\delta}$, and $Ba_aZr_bO_{x\pm\delta}$, with the proviso that positions held by oxygen may optionally be substituted by sulfur, where a, b, c, and d are each between 0 and 1, the sum of a through d equals 1 to 3, x is the sum of a through d plus 1, and δ is the vacancy concentration or excess oxygen/sulfur concentration.

19. The process of claim 1, wherein the a: least one metal-based component comprises one or more of $La_aCa_b$-$Mn_cCo_dTi_eO_{x\pm\delta}$, $La_aCa_bMn_cCo_dSn_eO_{x\pm\delta}$, $La_aCa_bCo_cO_{x\pm\delta}$, $La_aCa_bMn_cNi_dO_{x\pm\delta}$, $La_aCa_bMn_cCo_dSn_eO_{x\pm\delta}$, $La_aCa_bMn_c$-$Co_dAl_eO_{x\pm\delta}$, $La_aCa_bMn_cCo_dO_{x\pm\delta}$, $Ba_aK_bBi_cLa_dO_{x\pm\delta}$, $La_a$-$Ca_bMn_cTi_dAl_eO_{x\pm\delta}$, $La_aCa_bCo_cNi_dAl_eO_{x\pm\delta}$, $La_aCa_bCo_cTi_dO_{x\pm\delta}$, $La_aCa_bMn_cO_{x\pm\delta}$, $Ba_aBi_bLa_cO_{x\pm\delta}$, $La_aCa_bMn_cMg_dO_{x\pm\delta}$, $La_aCa_bMn_cFe_dO_{x\pm\delta}$, $La_aSr_bCo_cAl_dO_{x\pm\delta}$, $Ba_aBi_bYb_cO_{x\pm\delta}$, $Ba_aBi_bSn_cLa_dO_{x\pm\delta}$, $La_aCa_bMn_cGa_dO_{x\pm\delta}$, $La_aCa_b$-$Mn_cSn_dAl_eO_{x\pm\delta}$, $La_aCa_bMn_cCu_dO_{x\pm\delta}$, $La_aCa_bMn_cCo_d$-$Ga_eO_{x\pm67}$, $La_aCa_bMn_cAl_dO_{x\pm\delta}$, $La_aCa_bCo_cAl_dO_{x\pm\delta}$, $Ba_aBi_bSn_cLa_dO_{x\pm\delta}$, $La_aCa_bFe_cCo_dO_{x\pm\delta}$, $La_aCa_bMn_cCo_d$-$Ni_eAl_fO_{x\pm\delta}$, $Y_aCa_bMn_cO_{x\pm\delta}$, $La_aCa_bFe_cCo_dO_{x\pm\delta}$, and $Sr_aNa_bSn_cY_dO_{x\pm\delta}$, with the proviso that positions held by oxygen may optionally be substituted by sulfur, where a, b, c, d, e and f are each between 0 and 1, the sum of a through f equals 1 to 3, x is the sum of a through f plus 1, and δ is the vacancy concentration or excess oxygen/sulfur concentration.

20. The process of claim 1, wherein the at least one metal-based component comprises one or more of $In_aCu_b$-$Mn_cO_{x\pm\delta}$, $Mn_aCo_bO_{x\pm\delta}$, $In_aZn_bMn_cAl_dO_{x\pm\delta}$, $In_aZn_bMn_cO_{x\pm\delta}$, $Mn_aZn_bO_{x\pm\delta}$, $Mn_aZn_bAl_cO_{x\pm\delta}$, $In_aMn_bO_{x\pm\delta}$, $In_aMn_bAl_cO_{x\pm\delta}$, and $Mn_aZn_bTi_cO_{x\pm\delta}$, with the proviso that positions held by oxygen may optionally be substituted by sulfur, where a, b, c, and d are each between 0 and 1, the sum of a through d equals 1 to 3, x is the sum of a through d plus 1, and δ is the vacancy concentration or excess oxygen/sulfur concentration.

21. The process of claim 1, wherein the at least one metal-based component comprises at least one crystal structure selected from perovskite crystal structure, spinel crystal structure, or birnessite crystal structure.

22. The process of claim 1, wherein said at least one solid acid component comprises at least one molecular sieve selected from the group consisting of crystalline silicates, crystalline substituted silicates, crystalline aluminosilicates, crystalline substituted aluminosilicates, crystalline aluminophosphates, crystal line substituted aluminophosphates, zeolite-bound-zeolite, having 8- or greater-than-8 membered oxygen rings in framework structures.

23. The process of claim 1, wherein said at least one solid acid component comprises at least one crystalline substituted aluminophosphates selected from the group consisting of SAPO, MeAPO, MeAPSO, ELAPO, and ELAPSO.

24. The process of claim 1, wherein said affective catalytic reaction conditions include cracking and selective hydrogen combustion at from 475° C. to about 650° C.

25. The process of claim 1, wherein said effective catalytic reaction conditions include cracking and selective hydrogen combustion occurs at from 500° C. to about 600° C.

26. The process of claim 13, wherein step (C) includes cracking and selective hydrogen combustion at from 475° C. to about 650° C.

27. The process of claim 13, wherein step (C) includes cracking and selective hydrogen corn bastion occurs at from 500° C. to about 600° C.

* * * * *